United States Patent
Min et al.

(10) Patent No.: US 10,356,012 B2
(45) Date of Patent: Jul. 16, 2019

(54) TECHNIQUES FOR ROUTING PACKETS AMONG VIRTUAL MACHINES

(71) Applicant: Intel Corporation, Santa Clara, CA (US)

(72) Inventors: Alexander W. Min, Portland, OR (US); Tsung-Yuan Tai, Portland, OR (US); Ren Wang, Portland, OR (US); Mesut A. Ergin, Portland, OR (US); Jr-Shian Tsai, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 107 days.

(21) Appl. No.: 14/830,856

(22) Filed: Aug. 20, 2015

(65) Prior Publication Data

US 2017/0054658 A1     Feb. 23, 2017

(51) Int. Cl.
*H04L 12/931* (2013.01)
*G06F 9/46* (2006.01)
(Continued)

(52) U.S. Cl.
CPC ............... *H04L 49/70* (2013.01); *G06F 9/46* (2013.01); *H04L 45/38* (2013.01); *H04L 45/586* (2013.01); *H04L 45/74* (2013.01); *H04L 47/2441* (2013.01); *H04L 47/2483* (2013.01); *H04L 47/30* (2013.01); *H04L 49/25* (2013.01);
(Continued)

(58) Field of Classification Search
CPC . H04L 49/3045; H04L 49/70; H04L 43/0876; H04L 43/10; H04L 43/103; H04L 45/08; H04L 45/16; H04L 45/24; H04L 45/30; H04L 45/306; H04L 45/308; H04L 45/38; H04L 45/44; H04L 45/74; H04L 67/10; H04L 47/20; H04L 47/22; H04L 47/30; G06F 9/45533; G06F 2212/15–154; G06F 2009/45595

See application file for complete search history.

(56) References Cited

U.S. PATENT DOCUMENTS 5,440,691 A    8/1995   Carrafiello et al.
6,260,073 B1   7/2001   Walker et al.
(Continued)

OTHER PUBLICATIONS

International Search Report and Written Opinion received for PCT Patent Application No. PCT/US2016/047431, dated Nov. 30, 2016, 15 pages.

*Primary Examiner* — Joshua Kading

(57) ABSTRACT

Various embodiments are generally directed to techniques for improving the efficiency of exchanging packets among multiple VMs within a communications server, and between the communications server and other devices in a communications system. An apparatus may include a virtual switch to analyze contents of at least one packet of a set of packets to be exchanged between endpoint devices through a network, and to correlate the contents to a pathway to extend through one or more of the VMs that are each configured as virtual servers of multiple virtual servers; and an interface control component to select at least one virtual network interface of each of the one or more virtual servers along the pathway to operate in a polling mode, and to select a virtual network interface of at least one virtual server of the multiple virtual servers not along the pathway to operate in a non-polling mode.

24 Claims, 17 Drawing Sheets

(51) Int. Cl.
*H04L 12/947* (2013.01)
*H04L 12/851* (2013.01)
*H04L 12/721* (2013.01)
*H04L 12/713* (2013.01)
*H04L 12/741* (2013.01)
*H04L 12/835* (2013.01)
H04L 12/26 (2006.01)
H04L 12/927 (2013.01)
H04L 12/813 (2013.01)

(52) U.S. Cl.
CPC ........ *H04L 43/0852* (2013.01); *H04L 43/103* (2013.01); *H04L 43/16* (2013.01); *H04L 47/20* (2013.01); *H04L 47/80* (2013.01)

(56) References Cited

U.S. PATENT DOCUMENTS

| | | |
|---|---|---|
| 9,781,209 B2 * | 10/2017 | Ergin .................. H04L 67/1097 |
| 2009/0219936 A1 | 9/2009 | Tripathi et al. |
| 2013/0254766 A1 | 9/2013 | Zuo et al. |
| 2014/0115578 A1 * | 4/2014 | Cooper ................. G06F 21/606 |
| | | 718/1 |
| 2015/0055499 A1 | 2/2015 | Zheng et al. |
| 2016/0080505 A1 * | 3/2016 | Sahin .................. H04L 67/1027 |
| | | 709/229 |

* cited by examiner

TECHNIQUES FOR ROUTING PACKETS AMONG VIRTUAL MACHINES

BACKGROUND

Various communications systems, including both wired and wireless communications systems, employ servers to control the flow of communications traffic, provide security and other services, track amounts of data and/or amounts of time for each instance of use of services, etc. Such servers are often geographically distributed throughout various regions of the networks on which such communications systems are based, including at wired switch points and/or in the vicinity of transceiver installations.

In a recent trend, sets of multiple separate servers at each such geographically diverse location are being replaced by single physical servers that are each able to perform the various different functions of each of those separate servers within separate virtual machines (VMs). Continuing improvements in the performance and processing abilities of a single server have enabled a single server to employ such virtualization to do what once required multiple separate servers, but less expensively and with the consumption of less electrical energy. However, challenges remain in fully recreating the processing environments of each of those multiple separate servers among what is now the multiple VMs of a single server.

DETAILED DESCRIPTION

Figure 1:
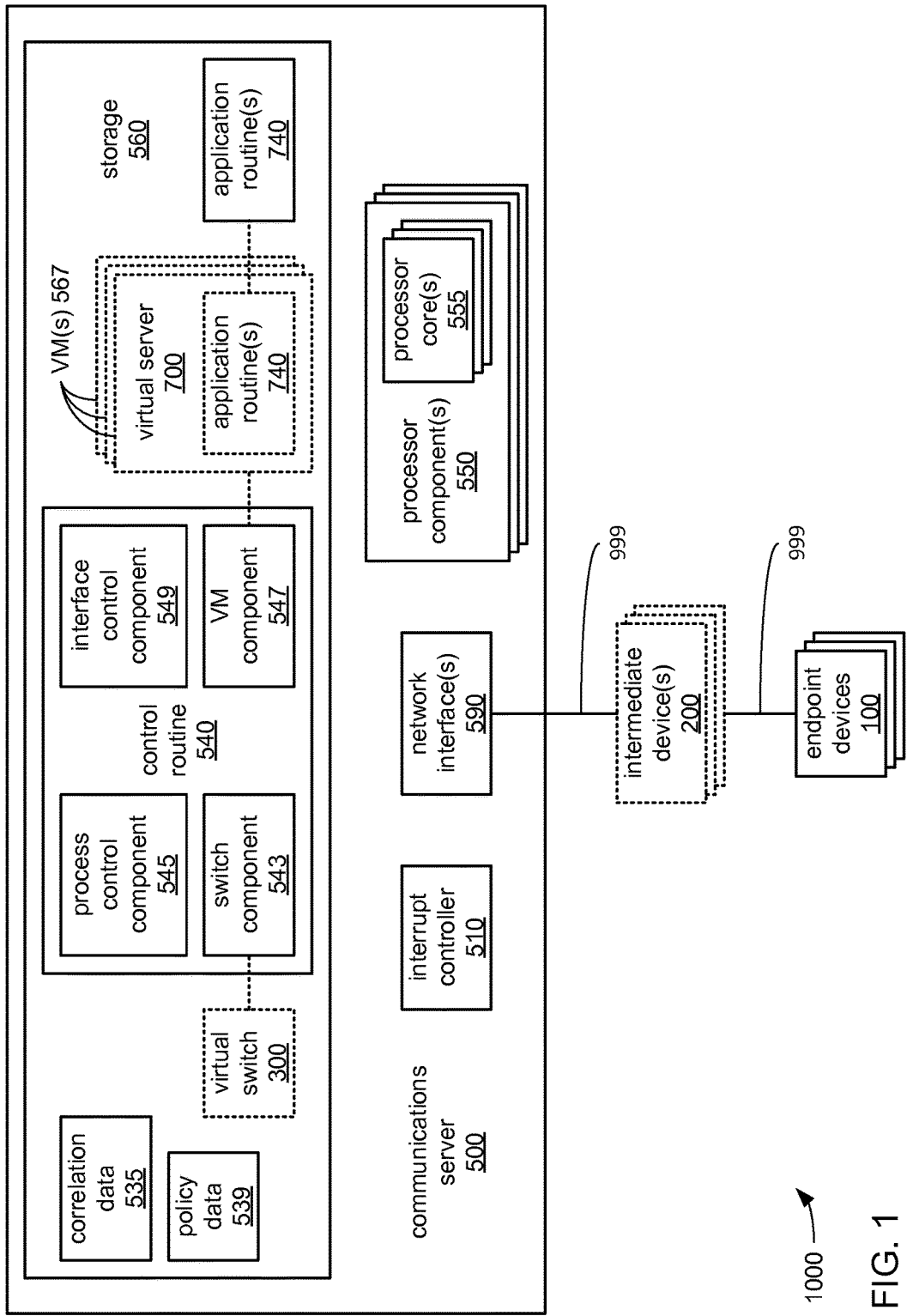
FIG. 1 illustrates an example embodiment of a communications system.

Various embodiments are generally directed to techniques for improving the efficiency of exchanging packets among multiple VMs within a communications server, and between the communications server and other devices in a communications system. Sets of packets received by the communications server may be analyzed to determine what pathway they are to follow among the multiple VMs within the communications server, and particular virtual network interfaces associated with particular VMs may be configured to employ polling, while others are not, based on that analysis.

Alternatively or additionally, various buffers associated with virtual network interfaces may be monitored, and the rate at which one or more of the VMs processes packets may be selectively increased and/or decreased to avoid overflow and/or underflow conditions in one or more of those buffers. Through such measures, multiple processor components and/or multiple processor cores of each processor component of the communications server may be utilized more efficiently, thereby reducing overall demand for processing resources, and accordingly, reducing overall demand for electrical power. Alternatively or additionally, through such measures, multiple processor components and/or multiple cores of each processor component may be utilized in a manner that closely follows the limits of a predetermined electrical power budget.

More specifically, multiple VMs generated within a communications server of a communications network may communicate with each other within that communications server through a virtual switch that is also generated within the communications server. Each VM may be configured to operate as a virtual version of what may otherwise be a physically separate and distinct server providing a particular service supporting communications between endpoint devices of the communications network. Such services may include, and are not limited to, monitoring duration and/or amounts of data exchanged for each instance of communications between two or more communications devices, establishment and/or maintenance of security for such communications, supporting movement of a communications device between portions of a single communications network and/or between different communications networks, etc. The virtual switch may be configured to operate as a virtual version of what may otherwise be a physically separate and distinct network switch coupling the aforementioned physically separate and distinct servers. The virtual switch may be generated within a host processing environment of the communications server in which a control routine may be executed that effects the generation of each of the VMs. Within the virtual switch and within each of the VMs may be defined one or more virtual network interfaces by which each of the VMs may be coupled to the virtual switch and by which the virtual switch may be coupled to one or more network interfaces of the communications server by which communications server is coupled to the communications network.

During operation of the communications server within the communications network, sets of packets may be exchanged between endpoint devices through the communications server. The set of packets may represent voice and/or non-voice audio, still images, motion video, documents, executable instructions, and/or any of a wide variety of other types of data that may be exchanged between communications devices through a communications network, including through one or more of such communications servers. Such a set of packets may need to proceed through particular VMs in a particular order to enable particular forms of processing to be performed on those packets within each of those VMs such that those packets may be said to follow a particular pathway (also often referred to as a "service function chain") through those VM(s). Since the VMs may each be coupled to the virtual switch to communicate with each other through the virtual switch, any such exchange of packets from one VM to another may pass through the virtual switch. Thus, a pathway followed by a particular set of packets through multiple VMs may entail multiple instances of passing through the virtual switch during each instance of being passed from one VM to another. Stated differently, the pathway may "loop through" the virtual switch multiple times as part of proceeding through those VMs. As a result, the pathway may proceed through multiple virtual network interfaces of the virtual switch and of each VM.

The virtual network interfaces within the virtual switch and within each VM may be operable in various different modes that provide different tradeoffs between latencies in exchanging packets and demands on processing resources. By way of example, interrupt-driven operation of a virtual network interface may greatly minimize the processing resources required to support that virtual network interface, but the time required to handle each interrupt may be so great that an unacceptable amount of latency may be added to the exchanging of packets through that virtual network interface. In contrast, operating a virtual network interface in a polling mode may ensure that packets are conveyed through that virtual network interface with minimal latency, but such use of polling may consume nearly all of the processing resources of an entire core of a processor component for just that one virtual network interface. Thus, the use of polling at each virtual network interface may require dedicating an entire processor core to each virtual network interface such that a large quantity of processor cores of a communications server may need to be dedicated to such polling where there are a large quantity of VMs that each transmit and receive packets.

A packet analyzer of a virtual switch may analyze the contents of one or more of the packets of a set of packets received from the communications network at a network interface of the communications server. Such analysis may include retrieving a destination address from the header, and/or determining a type of data or a size of a piece of data included in the payload of one or more of those packets. Such contents as the destination address, the type of data and/or the data size may then be correlated to a known pathway through multiple VMs within the communications server to determine what pathway the set of packets just received at the network interface may take. Upon determining what pathway is to be taken by a particular set of packets, particular ones of multiple virtual network interfaces that are along that pathway may be preemptively configured to operate in a polling mode to enable that set of packets to proceed along that pathway more quickly, while other virtual network interfaces that are not along that pathway may not be so configured. By identifying the pathways to be taken by each received set of packets through the virtual switch and among the VMs, and by limiting the use of polling mode to the virtual network interfaces that are within each such pathway, the number of processor cores that must be dedicated to such polling may be reduced while also minimizing the latencies encountered as each set of packets is exchanged between VMs.

In some embodiments, the communications server may receive a data structure providing the communications server with indications of known correlations between pathways that different sets of packets are likely to take and the contents of one or more of the packets within each of those different sets of packets (e.g., destination addresses that may be indicated in packet headers and/or various types and/or sizes of data that may be contained within packet payloads). In such embodiments, the communications server may then make use of the received data structure to correlate incoming sets of packets to pathways. Presuming that every incoming set of packets is then able to be correlated to a pathway through use of that data structure, the communications server may not need to "learn" the pathway to be taken by an incoming set of packets that cannot yet be correlated to that pathway via that data structure.

In other embodiments, the communications server may learn such correlations over time by observing the pathways taken by sets of packets associated with particular contents of one or more of the packets within each of those sets of packets (e.g., destination addresses, types of data and/or sizes of portions of data). In so doing, the communications server may then generate the data structure indicating such correlations, itself. Such learning of correlations may occur during operation of the communications server in a distinct learning mode that lasts for a selected period of time and/or ends when one or more criterion for the learning of such correlations have been met. During such a learning mode, multiple virtual network interfaces within the communications server, if not the majority or all of those virtual network interfaces, may be operated in a polling mode, thereby consuming considerable processing resources and/or electric power. This may be done to ensure that at least multiple ones of the virtual network interfaces are operated in a manner that minimizes latencies in conveying of sets of packets among the VMs, as well as in and out of the communications server, regardless of what pathway each of the sets of packets may take. Upon cessation of the learning mode, numerous virtual network interfaces within the communications server, if not the majority or all of those virtual network interfaces, may be operated in a mode other than the polling mode, thereby conserving processing resources and/ or electric power. The network interface by which the communications server receives sets of packets may be continuously operated in a polling mode to minimize the latency with which sets of packets are so received, while various ones of the virtual network interfaces may be operated in polling mode in response to an analysis of a set of packets, as described earlier.

In still other embodiments, the communications server may still be provided with such a data structure to correlate sets of packets to various pathways such that there may be no distinct learning mode into which the communications server enters to generate that data structure, itself. However, in response to receiving an incoming set of packets that cannot be correlated to a particular pathway through use of the received data structure, the communications server may temporarily enter into a learning mode throughout the time that such a received set of packets continues to be processed by any VM within the communications server. In such a temporary learning mode, multiple virtual network interfaces within the communications server, if not the majority or all of those virtual network interfaces, may be operated in a polling mode to ensure that no undue amount of latency is introduced in the processing of that set of packets as that set of packets proceeds on its pathway among the VMs of the communications server. As that set of packets proceeds along that pathway, the virtual switch may monitor the pathway it takes through the VMs, and may augment the data structure with an indication of a correlation between that pathway and the contents of one or more packets of that set of packets (e.g., destination address(es) that may be indicated in packet header(s), and/or the type(s) and/or size(s) of data that may be contained within packet payload(s)).

The virtual network interfaces associated with each of the VMs may include buffers for the transmission and/or reception of packets that are recurringly monitored, and the rate at which packets are processed within a VM may be increased or decreased to adjust the rate at which such a buffer associated with a virtual network interface of that VM is filled and/or emptied to prevent an instance of buffer overflow and/or underflow. Occurrences of such a buffer overflow or underflow at a virtual network interface of a VM may trigger context switches by a core of a processor component that executes instructions associated with that VM, thereby causing that core to execute instructions of an entirely separate process to address that buffer overflow or underflow, followed by another context switch to resume executing instructions associated with that VM. By way of example, execution of instructions to maintain that VM by that core to be preempted in favor of executing instructions of VM monitor (VMM) software in a more privileged context to perform various "housekeeping" functions to address such events, followed by a return to executing instructions to maintain that VM. Each such context switch may take a considerable amount of time to perform and may consume considerable processing resources such that there may be a delay in the resumption of executing instructions associated with a VM that may be sufficiently long as to introduce an unacceptable amount of latency in the processing of packets. Alternatively or additionally, the additional processing resources required to support such context switching for multiple VMs may require the allocation of considerably more processor cores in a server to await instances in which one or more of such context switches may need to be performed at times that may not be predictable.

The frequency of occurrences of such buffer underflows and/or overflows may be increased in servers employing multiple VMs to provide various functions in a communications system, since the frequent exchanging of large sets of packets as often takes place in communications networks may lead to network traffic made up of exchanges of packets in bursts of network activity, rather than at a relatively more steady rate. Where such bursts of network activity results in wide variations in the rate at which packets are exchanged, the buffers of the virtual network interfaces within such a server may easily be at risk of frequently transitioning between fully empty and fully loaded statuses that can then cause back-to-back occurrences of context switching to address each such situation. The result can be that more processing resources of a processor core are employed in performing context switches triggered by such statuses of buffers of the virtual network interfaces of a VM than in actually processing packets within that VM.

To prevent or to at least minimize occurrences of the need for such context switching, the degree to which each such buffer of each VM is full may be recurringly compared to underflow and/or overflow thresholds to determine whether to adjust the rate at which packets are processed in that VM. Where the degree to which a buffer for receiving packets at a VM is full falls low enough to meet or fall below an underflow threshold or where the degree to which a buffer for transmitting packets from that VM is full rises high enough to meet or exceed an overflow threshold, the rate at which packets are processed within that VM may be reduced to reduce the rate at which that receiving buffer is emptied and/or at which that transmission buffer is filled. Conversely, where the degree to which a buffer for receiving packets at a VM is full rises high enough to meet or exceed an overflow threshold or where the degree to which a buffer for transmitting packets from that VM is full falls low enough to meet or fall below an underflow threshold, the rate at which packets are processed within that VM may be increased to increase the rate at which that receiving buffer is emptied and/or at which that transmission buffer is filled In some embodiments, the rate at which a VM processes packets may be varied by varying the rate at which a processor core executes instructions associated with the processing of those packets within that VM. This may be done by causing that processor core to execute more or fewer instructions associated with one or more other processes that may or may not be associated with that VM. By way of example, where the rate at which packets are processed within that VM is to be reduced, then a processor core employed in executing instructions associated with the processing of packets within that VM may be caused to also execute a greater quantity of instructions to effect other functions associated with that VM, such as instructions to calculate performance statistics associated with that VM. Alternatively or additionally, that processor core may be caused to also execute instructions that may serve no other purpose than to consume at least some of the processing resources of that processor core such that fewer processing resources thereof are available for processing packets within that VM.

In other embodiments, the VM may recurringly provide indications of the current state of the buffers of its virtual network interfaces to a control routine that is executed within the host processing environment of the communications server to generate and monitor the VMs. Such a control routine may use such information concerning the current state of those buffers to determine whether to vary the rate at which packets are processed within that VM by varying the clock frequency and/or other aspects of a processor core that executes the instructions to process packets within that VM. In still other embodiments, such information may be used to determine whether to selectively switch the virtual network interfaces of that VM into and/or out of a polling mode to change a latency by which packets are conveyed through one or more of those virtual network interfaces.

In various embodiments, one or more pairs of VMs may incorporate an ability to directly exchange packets that bypasses the virtual switch. Such an ability may be implemented in a variety of ways, including as a buffer or other storage space that is shared between or otherwise made accessible to both VMs in each such pair of VMs. At various times and/or under specific conditions monitored for by one or more of the VMs, a VM may select to make use of such an ability to directly provide a set of packets to another VM, instead of providing that set of packets to that other VM through the virtual switch. Such direct exchanges of packets between VMs may enable the transfer of packets among VMs more quickly than exchanges of packets between VMs performed through the virtual switch.

In such embodiments, the virtual switch may employ data concerning what pairs of VMs are able to engage in such direct exchanges of packets, as well as data indicating the specific conditions under which each such pair of VMs will directly exchange packets, in determining which virtual network interfaces are to be operated in polling mode based on an analysis of a set of packets received by the communications server from the communications network. More specifically, where two VMs are along a pathway to be followed by a set of packets such that the set of packets is to proceed from one of those two VMs to the other, and where those two VMs are able to directly exchange that set of packets, the virtual network interfaces of those two VMs that would otherwise be used to convey that set of packets from that one VM to that other through the virtual switch may not be operated in polling mode as a result of not being needed in view of the ability to directly exchange that set of packets.

Also, in some of such embodiments, the ability to directly exchange packets between VMs may be implemented using one or more of the buffers otherwise normally used by one or more of the virtual network interfaces of one or more of the VMs. Where such direct transfers of packets are able to be performed more quickly than through the virtual switch, this alternate use of such buffers may result in such buffers being filled up and/or emptied more quickly than would occur if packets were exchanged through the virtual switch. As a result, mechanisms employed to vary the rate at which packets are processed within a VM may need to be selected to enable relatively quick changes in the rate at which packets are so processed in order to be sufficiently responsive to either the arrival of a relatively large quantity of packets directly from another VM and/or the transmission of a relatively large quantity of packets directly to another VM.

In various embodiments, the communications server may also receive policy data that provides the communications server with settings for one or more aspects of the operation of the communications server. Among such aspects may be a specification of the conditions under which a learning mode is to begin and/or is to cease. Also among such aspects may be a specification of which virtual network interfaces are to be operated in a polling mode during a learning mode. Further, among such aspects may be a specification of what the underflow and/or overflow thresholds are and/or what mechanism is to be used to vary the rate at which packet are processed in a VM. Still further, among such aspects may be a specification of the conditions under which one or more VMs may directly transfer a set of packets to another VM, instead of through the virtual switch.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a communications system 1000 providing a communications network 999 through which packets of data may be exchanged between endpoint devices 100 through a communications server 500. As depicted, the communications system 1000 may incorporate multiple ones of the endpoint devices 100, one or more intermediate devices 200 at one or more locations within the network 999, and/or at least one of the communications server 500. The communications server 500 and/or the intermediate device(s) 200 may be operated by a communications services provider (e.g., a corporate, governmental or other entity) to provide communications services to enable the exchange of packets among the endpoint devices 100.

In various embodiments, each of the endpoint devices 100 may be any of a variety of types of communications device, including and not limited to, wired or wireless telephones (e.g., smart phones), mobile devices (e.g., tablet or laptop computers), stationary computing devices (e.g., desktop computers), surveillance devices (e.g., cameras), remote monitoring devices (e.g., seismographic sensors), etc. The endpoint devices 100 may exchange sets of packets through the network 999 and through the communications server 500 to convey any of a variety of types of data, including and not limited to, voice and/or non-voice audio, still images, motion video, documents, etc. Additionally, each piece of data, regardless of its type, may be any of a variety of sizes as measured in bits, bytes, words, doublewords, quadwords, etc. Depending on the types of communications supported among the endpoint devices 100, there may or may not be correlations among particular types of data and particular data sizes (e.g., motion video data tending to be larger in its data size than audio or textual data).

The network 999 may include wired and/or wireless portions by which the sets of packets are conveyed between each of the endpoint devices 100 and the communications server 500 where the communications server 500 may then control and effect the relaying of the sets of packets between different ones of the endpoint devices 100. At least a portion of the network 999 may include one or more of the intermediate devices 200 to convert between wired and wireless portions, to buffer signals, to convert protocols, etc. Stated differently, in embodiments that include one or more of the intermediate devices 200, the intermediate devices 200 may include one or more of network routers, network bridges, network switches, network relays, media converters, protocol converters, transmitters and/or receivers, etc.

The communications server 500 may be any of a variety of types of computing device selected to have sufficient processing, network interfacing capacity and/or other resources to process and exchange sets of packets between endpoint devices 100 through the network 999 with minimal latency. The minimization of latency introduced in exchanging sets of packets between endpoint devices 100 through the network 999 and through the communications server 500 may be deemed an important requirement of the operation of the communications system 1000 to ensure that exchanges of packets associated with two-way voice and/or video communications occurs without perceivable and/or appreciable delay between persons operating the endpoint devices 100 to communicate with each other.

In various embodiments, the communications server 500 may incorporate one or more processor components 550, a storage 560, an interrupt controller 510, and/or one or more network interfaces 590 to couple the communications server 500 to the network 999. Each of the processor components 550 may incorporate one or more processor cores 555. The storage 560 may store one or more of a control routine 540, one or more different application routines 740, a policy data 539 and a correlation data 535. The control routine 540 and/or the one or more application routines 740 may incorporate a sequence of instructions operative on the one or more processor cores 555 of the one or more processor components 550 to implement logic to perform various functions.

As depicted, the control routine 540 may incorporate a switch component 543, a process control component 545, a VM component 547, and/or an interface control component 549. In executing the control routine 540, one or more processor cores 555 among one or more of the processor components 550 may execute the instructions of one or more of these components 543, 545, 546 and 549. Specifically, in executing the switch component 543, one or more of the processor cores 555 may be caused to instantiate a virtual switch 300. Alternatively or additionally, in executing the VM component 547, one or more of the processor cores 555 may be caused to instantiate one or more VMs 567 within separate locations allocated within the storage 560. As depicted, each of which may be configured as an instance of a virtual server 700 executing one of the different application routines 740.

Figure 2A:
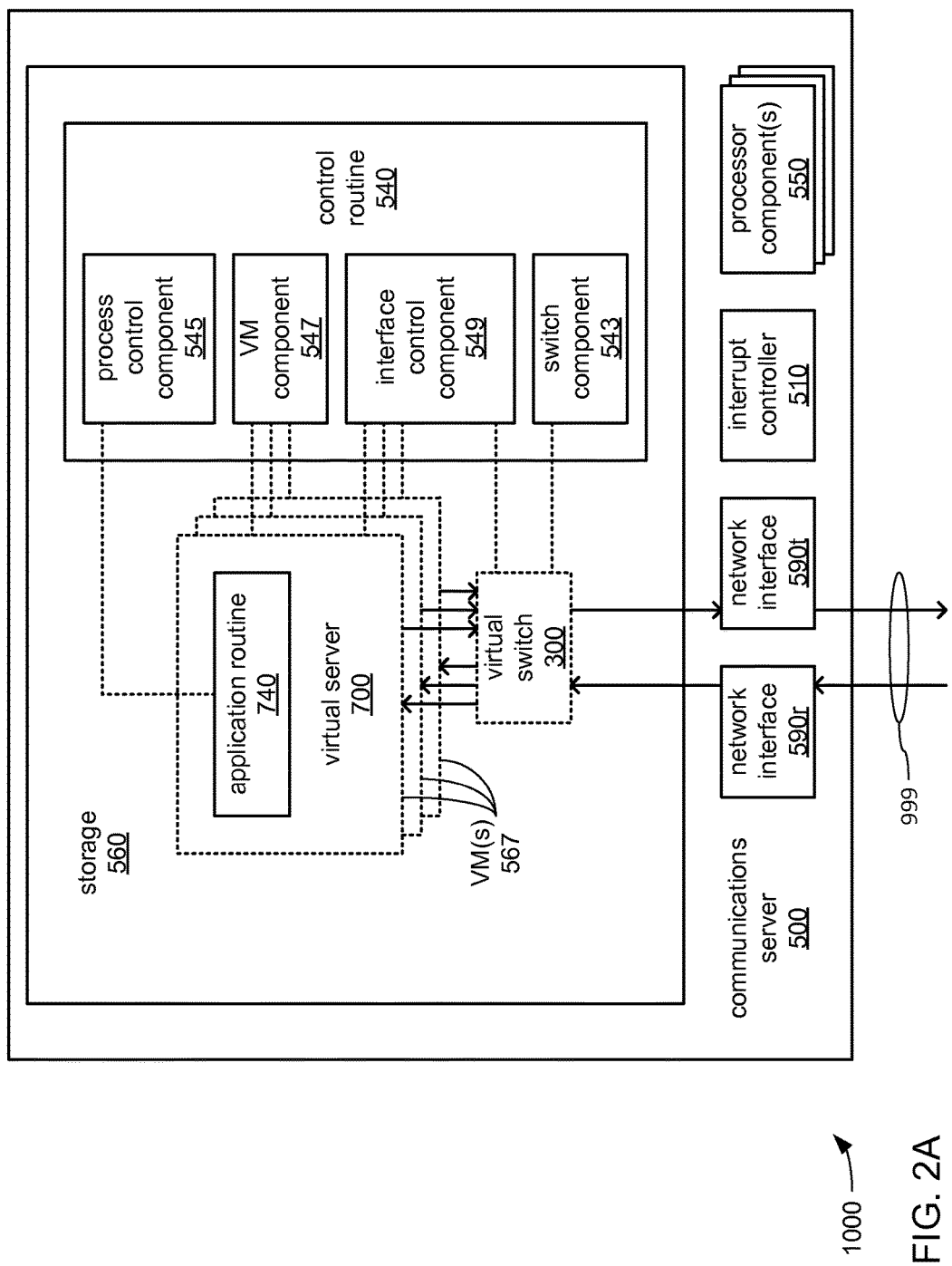
FIGS. 2A and 2B, together, illustrate an example embodiment of a communications server.
Figure 2B:
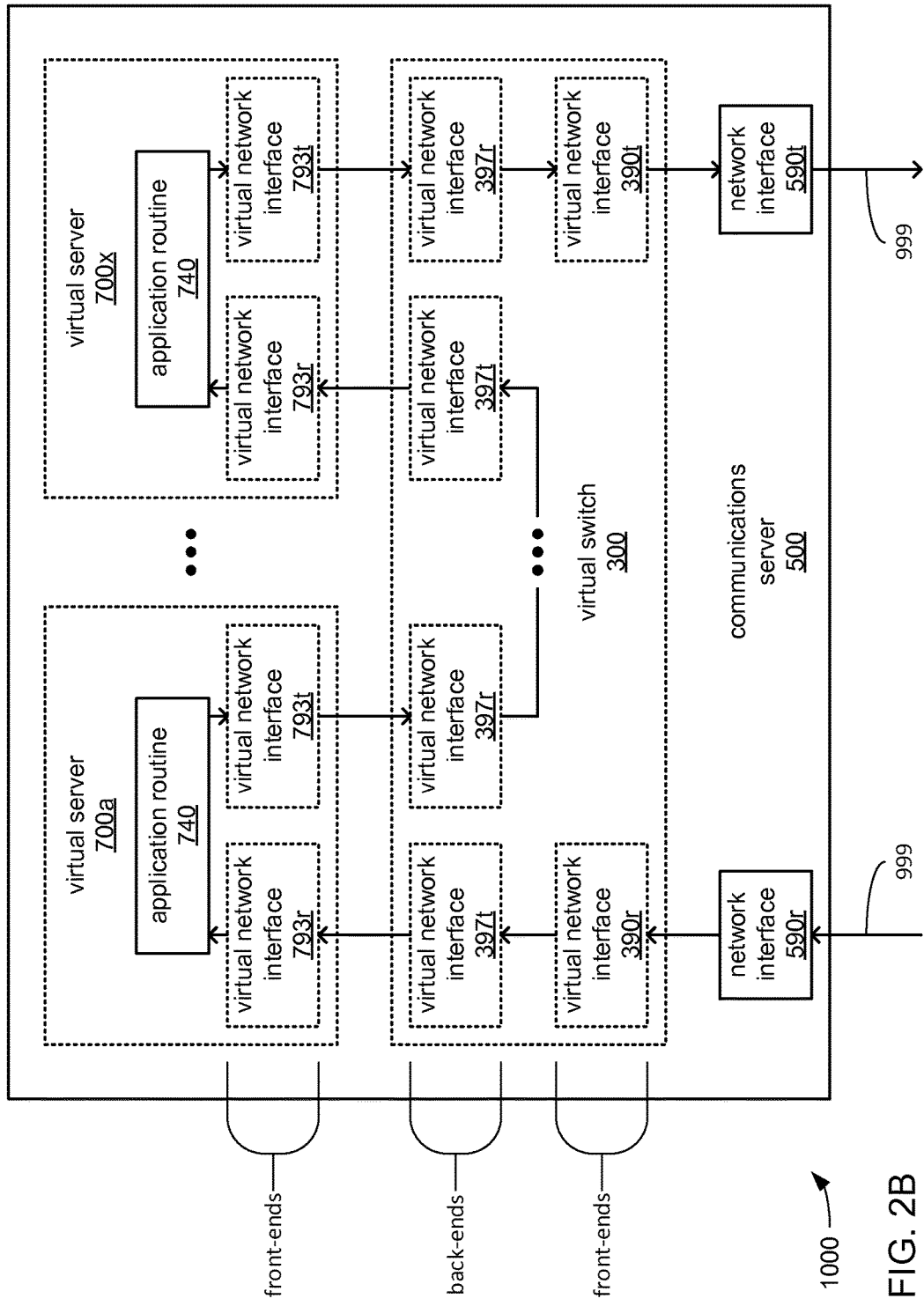

FIGS. 2A and 2B, together, depict aspects of the operation of an example embodiment of the communications server 500 in greater detail. Among those aspects are those of the instantiation and operation of the virtual switch 300. Also among those aspects are those of the execution of one or more of the application routines 740 within one or more instances of the virtual server(s) 700.

As previously discussed, one or more VMs 567 may be instantiated, and each of those VMs 567 may be configured as an instance of a virtual server 700. Within each of the virtual servers 700, the one or more processor cores 555 that are caused by the VM component 547 to instantiate the VM 567 on which each of the virtual servers 700 is based may be caused to execute one of the application routines 740 within that virtual environment to perform any of a variety of operations in support of communications between at least a pair of the endpoint devices 100. More precisely, different ones of the application routines 740 may cause one or more of the processor cores 555 to perform various different processing operations on sets of packets exchanged between at least a pair of the endpoint devices 100 as part of establishing and/or supporting a communications session therebetween. Such processing operations performed on sets of packets may include, and are not limited to, verification of authorization given to an endpoint device to use the communications system 1000, associating a communications session with an authorized account to track its occurrence, tracking a duration of a communications session, tracking an amount of data exchanged during the communications session, tracking changes in geographic location of one of the endpoint devices 100, providing various convenience services to one of the endpoint devices 100 (e.g., voicemail, voice-based dialing, conference calling, antivirus data scanning, etc.).

The one or more virtual servers 700 may be instantiated within the communications server 500 as part of employing the communications server 500 to replace what may have previously been multiple separate servers that may have each performed only one of the different types of processing operations performed by each of the application routines 740. Exactly what processing operations are performed by each of the virtual servers 700 may be largely determined by which one(s) of the different application routines 740 may be executed within each. Such use of the communications server 500 to replace multiple separate servers may be deemed desirable to reduce costs, to reduce consumption of electric power, and/or to increase the efficiency with which those processing operations are performed.

Turning more specifically to FIG. 2A, in addition to replacing multiple separate servers, the communications server 500 may also be operated to replace a separate physical network switch that might have otherwise coupled the multiple separate servers to each other and to the network 999 with a virtual switch. More specifically, one or more of the processor cores 555 may be caused by execution of the switch component 543 to instantiate the virtual switch 300 to couple each of the virtual servers 700 to each other and to the network 999. As depicted, the virtual switch 300 may be so instantiated to be interposed between the one or more network interfaces 590 and the one or more virtual servers 700 of the one or more VMs 567. As also depicted, among the one or more network interfaces 590 incorporated into the communications server 500 may be a distinct network interface 590r to receive sets of packets from the endpoint devices 100 via the network 999 and a distinct network interface 590t to transmit sets of packets to the endpoint devices 100 via the network 999. However, other embodiments are possible in which there may be other quantities of the network interfaces 590 that may each be used in various ways to exchange packets with the endpoint devices 100.

Turning more specifically to FIG. 2B, regardless of the exact quantity and/or exact manner of use of the one or more network interfaces 590, as depicted, the sets of packets received by the server 500 from one of the endpoint devices 100 may be routed by the virtual switch 300 through one or more of the virtual servers 700 for one or more forms of processing within each of the one or more virtual servers 700 before being transmitted to another of the endpoint devices 100. More specifically and as depicted, there may be any number of virtual servers 700 (as indicated by the depiction of virtual servers 700a through 700x) through which such sets of packets may be routed by the virtual switch 300 in a serial or "daisy chain" manner. Further, different sets of packets may be routed by the virtual switch 300 through more or fewer of the virtual servers 700 and/or in differing order such that different sets of packets may follow different "pathways" through one or more different ones of the virtual servers 700. The differences among the various pathways that may be taken by different sets of packets may be caused by services needed by some of the endpoint devices 100 that are not needed by others, load balancing among multiple ones of the virtual servers 700 that perform the same processing operation, differences in types and/or sizes of data conveyed, etc.

As also depicted, the virtual switch 300 and each of the virtual servers 700 may include multiple virtual network interfaces that enable the virtual switch 300 and the virtual servers 700 to interact to exchange packets in a manner resembling how the physically distinct network switch and the multiple physically distinct servers that they replace would have interacted to exchange packets. More specifically, in executing the switch component 543 to provide the virtual switch 300, one or more of the processor cores 555 may be caused to generate virtual network interfaces 390r and 390t corresponding to and coupled to the network interfaces 590r and 590t, respectively, to receive and transmit sets of packets from and to the network 999. Also, in executing the switch component 543, the same one or more of the processor cores 555 may be caused to generate multiple pairs of network interfaces 397t and 397r that may each be employed to transmit and receive, respectively, sets of packets to and from one of the virtual servers 700. Further, in executing the VM component 547 to provide the VMs 567 configured as instances of the virtual servers 700, multiple ones of the processor cores 555 may be caused to generate a pair of virtual network interfaces 793r and 793t within each of the virtual servers 700 to receive and transmit, respectively, sets of packets from and to a corresponding pair of the virtual network interfaces 397t and 397r of the virtual switch 300. As further depicted, within each of the virtual servers 700, sets of packets received from the virtual switch 300 by the virtual network interface 793r are provided to the application routine 740, and following the processing performed on those sets of packets due to execution of the application routine 740 therein, those sets of packets are then provided to the virtual network interface 793t for transmission back to the virtual switch 300.

It should be noted that the virtual network interfaces 793r and 793t within each of the virtual servers 700 (including each of the depicted virtual servers 700a and 700x) may also be referred to as the "RX front-end" and the "TX front-end," respectively, of each of the virtual servers 700. Correspondingly, each of the sets of the virtual interfaces 397t and 397r within the virtual switch 300 (and that corresponds to the "front-ends" of one of the virtual servers 700) may also be referred to as one of the sets of a "TX back-end" and a "RX back-end," respectively, of the virtual switch 300. Further, the virtual network interfaces 390r and 390t within the virtual switch 300 (each of which corresponds to one of the physical network interfaces 590r and 590t, respectively) may also be referred to as the "RX front-end" and the "TX front-end," respectively, of the virtual switch 300.

Turning again more specifically to FIG. 2A, in executing the control routine 540, at least one of the processor cores 555 of at least one of the processor components 550 may execute the interface control component 549 to control aspects of the exchanging of packets, and/or the process control component 545 to the control aspects of the processing of sets of packets. As will be explained in greater detail, one or more of the virtual network interfaces 390r, 390t, 397r, 397t, 793r and 793t may be operable in different modes to cause quicker exchanges of sets of packets to occur with greater efficiency. As will also be explained in greater detail, the execution of the application routines 740 within each of the virtual servers 700 may be controllable to vary the rate at which packets are processed therein.

Figure 3:
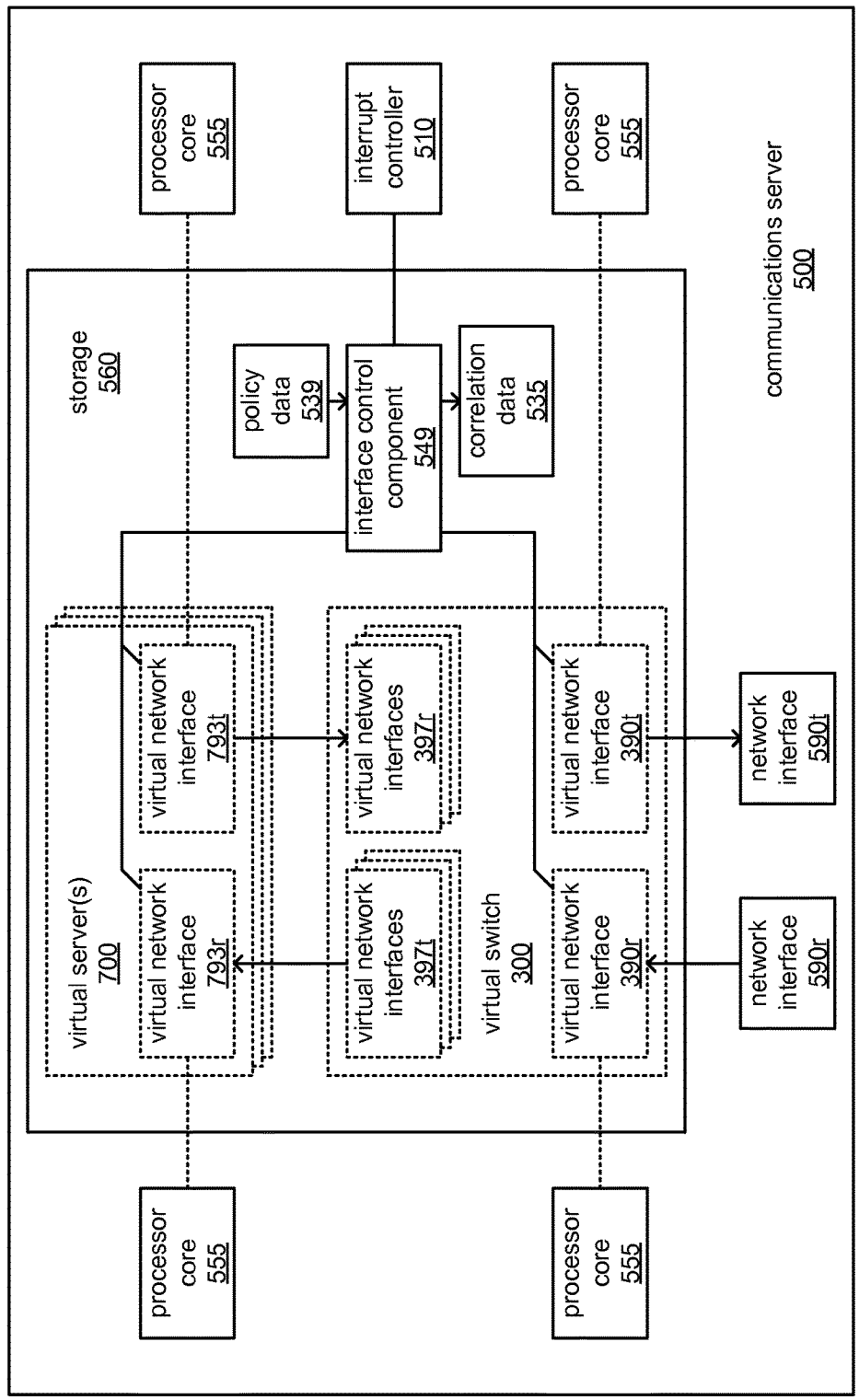
FIG. 3 illustrates an example embodiment of learning pathways taken by sets of packets.

FIG. 3 depicts aspects of controlling the operation of one or more virtual network interfaces of the virtual switch 300 and/or of one or more of the virtual servers 700. In various embodiments, one or more of the virtual network interfaces 390r, 390t, 397r, 397t, 793r and/or 793t may be operated in one of multiple modes. One of those modes may be an interrupt-driven mode, and another of those modes may be a polling mode. Further, in executing the interface control component 549, at least one of the processor cores 555 of at least one of the processor components 550 may selectively operate different ones of these virtual network interfaces in different modes.

In an interrupt-driven mode, the virtual network interface 390r may trigger an interrupt upon receiving one or more packets from one of the network interfaces 590 (e.g., the network interface 590r), and/or one of the virtual network interfaces 793r may trigger an interrupt upon receiving one or more packets from one of the virtual network interfaces 397t. In various embodiments, such interrupts may be conveyed directly to at least one of the processor components 550, or may be so conveyed indirectly through the interrupt controller 510. Regardless of the manner in which the interrupt is conveyed, at least one processor core 555 of at least one of the processor components 550 may respond to such an interrupt by jumping to and commencing execution of instructions associated with the one of the virtual network interfaces that triggered the interrupt to cause the received one or more packets to be conveyed onward either to another virtual network interface for transmission or to one of the application routines 740 to be processed.

Thus, by way of example, where the virtual network interface 390r receives one or more packets from the network interface 590r, the virtual network interface 390r may trigger an interrupt to cause at least one processor core 555 to execute a portion of the switch component 543 associated with the virtual network interface 390r to cause the one or more received packets to be conveyed to one of the virtual network interfaces 397t for transmission to one of the virtual network interfaces 793r of one of the virtual servers 700. Similarly, by way of example, where the virtual network interface 793r of one of the virtual servers 700 receives one or more packets from one of the virtual network interfaces 397t, that virtual network interface 793r may trigger an interrupt to cause at least one processor core 555 to execute a portion of the VM component 547 associated with that virtual network interface 793r to cause the one or more received packets to be conveyed to the one of the application routines 740 associated with that virtual server 700 for processing.

Also, in such an interrupt-driven mode, the virtual network interface 390t may trigger an interrupt upon being provided with one or more packets to transmit to one of the network interfaces 590 (e.g., the network interface 590t) for being transmitted onto the network 999, and/or one of the virtual network interfaces 793t may trigger an interrupt upon being provided with one or more packets from a corresponding one of the application routines 740 to be transmitted to one of the virtual network interfaces 397r. Again, at least one processor core 555 of at least one of the processor components 550 may respond to such an interrupt by jumping to and commencing execution of instructions associated with the one of the virtual network interfaces that triggered the interrupt to cause the provided one or more packets to be transmitted onward.

Thus, by way of example, where the virtual network interface 390t is provided with one or more packets to transmit to the network interface 590t, the virtual network interface 390t may trigger an interrupt to cause at least one processor core 555 to execute a portion of the switch component 543 associated with the virtual network interface 390t to cause the one or more provided packets to be so transmitted to the network interface 590t for transmission onward to one of the endpoint devices 100 via the network 999. Similarly, by way of example, where the virtual network interface 793t of one of the virtual servers 700 is provided with one or more packets to transmit to one of the virtual network interfaces 397r of the virtual switch 300, that virtual network interface 793t may trigger an interrupt to cause at least one processor core 555 to execute a portion of the VM component 547 associated with that virtual network interface 793t to cause the one or more provided packets to be so transmitted to that virtual network interface 397r.

Such an interrupt-driven mode enables the exchanging of packets among the network interfaces 590, the virtual switch 300 and the one or more virtual servers 700 with little or no processing resources required until packets are received or are provided for transmission. However, the use of interrupts to trigger the commencement of using processing resources to perform such exchanges may introduce substantial latencies in the processing of packets through one or more virtual servers 700 that may be deemed unacceptably long.

In a polling mode, at least one processor core 555 may be allocated to execute instructions of the switch component 543 that provides the virtual network interfaces 390r and 390t of the virtual switch 300 on a continuous basis to recurringly check for the receipt of any packets from the network interface 590r and/or to recurringly check for the provision of any packets to be transmitted to the network interface 590t, respectively. Similarly, in such a polling mode, at least one processor core 555 may be allocated to execute instructions of the VM component 547 that provides the virtual network interfaces 793r and 793t of one or more of the virtual servers 700 on a continuous basis to recurringly check for the receipt of any packets from a virtual network interface 397t of the virtual switch 300 and/or to recurringly check for the provision by one of the application routines 740 of any packets to be transmitted to one of the virtual network interfaces 397r of the virtual switch 300.

With such recurring polling, events such as the receipt of packets from another network interface (whether virtual, or not), and events such as the provision of packets to transmit by a virtual network interface are able to be responded to relatively quickly by one of the processor cores 555 that is already allocated to perform the polling. In contrast, in an interrupt-driven mode, one of the processor cores 555 is not allocated to respond to such events until after an interrupt has been triggered, thereby adding the entire time to generate the interrupt and allocate one of the processor cores 555 to the latency of processing packets. Thus, the use of polling enables quicker exchanges of packets among the network interfaces 590, the virtual switch 300 and/or the one or more virtual servers 700. Given the need in many circumstances for packets to be exchanged between endpoint devices 100 with minimal overall latency, the latencies added by the use of such an interrupt-driven mode may be deemed unacceptable, and therefore, the use of such a polling mode may be deemed a necessity.

However, it has found that performing the recurring polling with sufficient frequency to sufficiently minimize latencies at a virtual network interface may consume the processing resources of an entire processor core 555 such that a separate one of the processor cores 555 must be entirely dedicated to each virtual network interface at which such polling is to occur. Also, this need to dedicate an entire one of the processor cores 555 to one of the virtual network interfaces does not vary or change depending on whether or not there is a relatively lengthy period of time during which that virtual network interface is not involved in any exchange of packets. In other words, such a dedicated one of the processor cores 555 does not become available for other uses during times when that virtual network interface is not actually engaged in exchanging packets. Where there are numerous ones of the virtual servers 700, the resulting allocation of an entire processor core 555 to each one of the correspondingly numerous virtual network interfaces may be deemed to be at least an inefficient use of processing resources, and accordingly, an inefficient use of electrical power. Stated differently such use of polling may not be deemed to be sufficiently scalable as the number of virtual servers 700 increases.

To gain the advantages of a polling mode in minimizing latencies without the disadvantages of allocating a prohibitive number of the processor cores 555 to performing such polling, different ones of the virtual network interfaces of the virtual switch 300 and/or of the one or more virtual servers 700 may be selectively and dynamically configured to operate in either a polling mode or a non-polling mode (e.g., an interrupt-driven mode) based on an analysis of packets received by the communications server 500 from the endpoint devices 100. More precisely, destination information in the header and/or data conveyed in the payload of one or more packets within a received set of packets may be analyzed to determine which ones of the virtual servers 700 are to process that set of packets such that those particular ones of the virtual servers 700 are in the pathway that will be followed by that set of packets through the communications server 500.

Figure 4A:
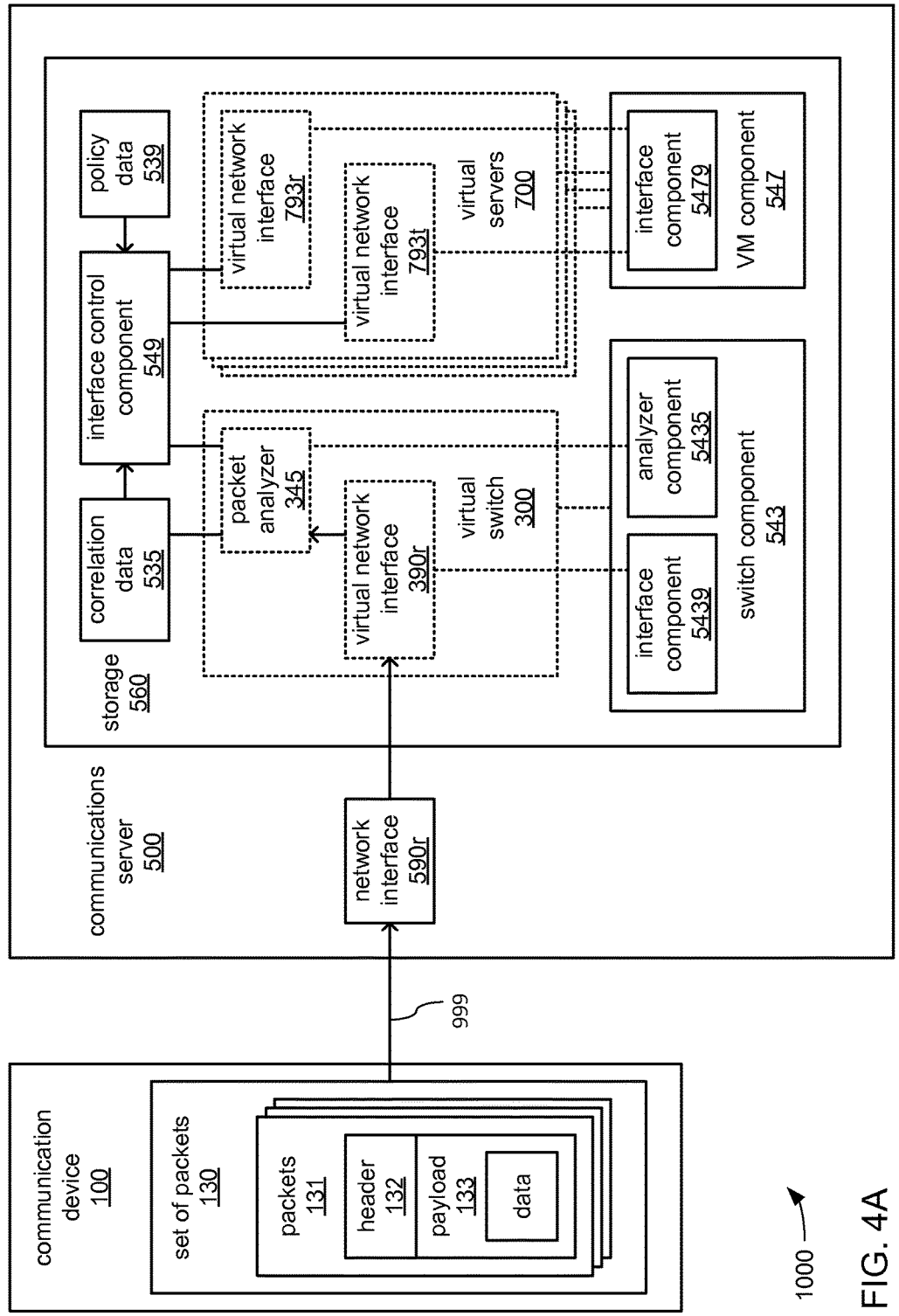
FIGS. 4A and 4B, together, illustrate an example embodiment of using learned pathway of sets of packets to control virtual network interfaces.
Figure 4B:
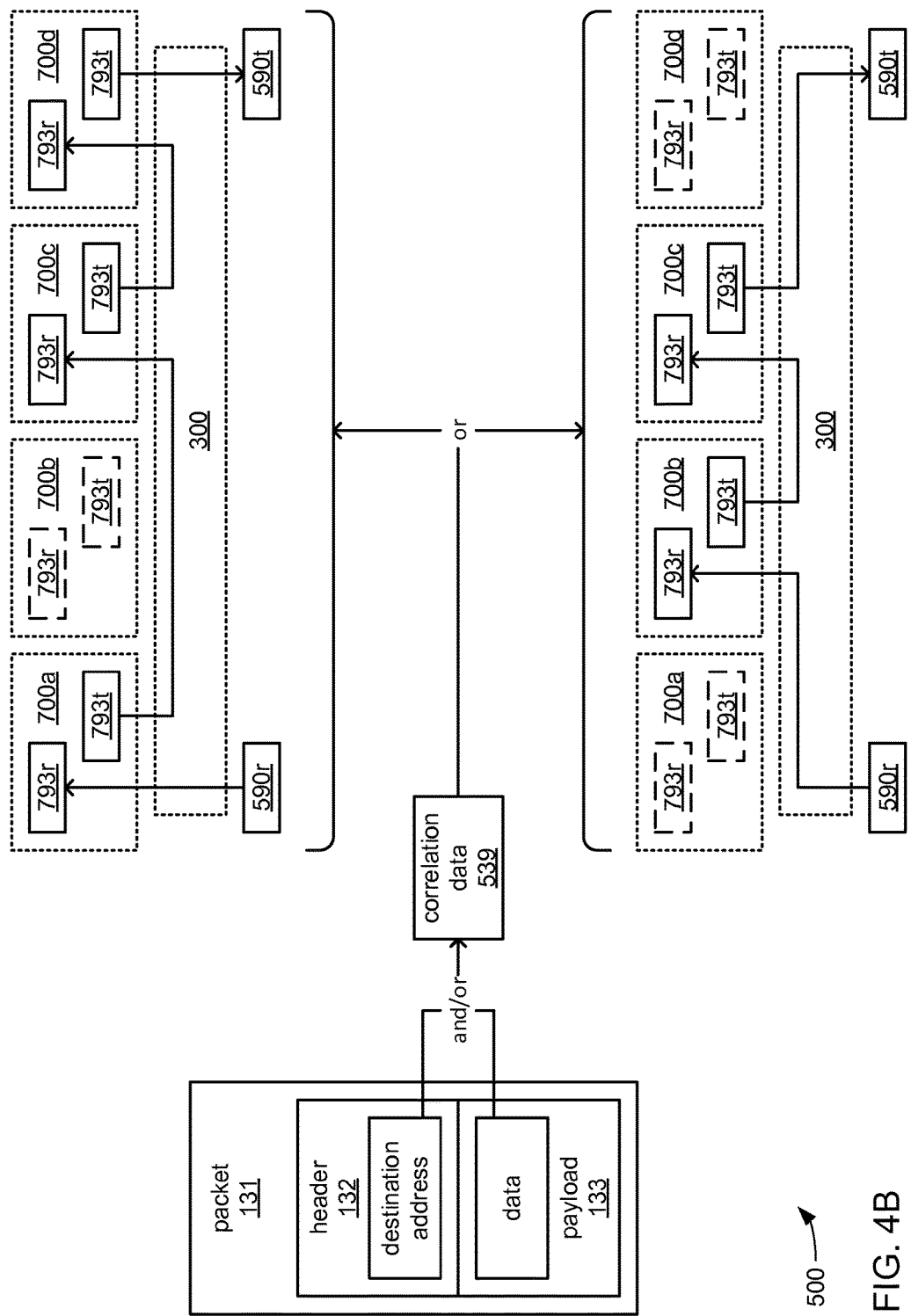

FIGS. 4A and 4B, together, depict aspects of the dynamic selection of different virtual network interfaces to operate in a polling mode based on an analysis of a set of packets received by the communications server 500. Among those aspects is analyzing a header 132 and/or a payload 133 of one or more packets 131 that make up a set of packets 130 received at a network interface 590 of the communications server 500. Also among those aspects are correlating what is so analyzed with a pathway to be followed by the set of packets 130 through one or more of the virtual servers 700, and dynamically configuring virtual network interfaces of those one or more virtual servers 700 to operate in a polling mode.

Turning to FIG. 4A, as previously discussed, execution of the VM component 547 may cause one or more of the processor cores 555 to instantiate one or more VMs 567 and to configure each of those VMs 567 as an instance of a virtual server 700. Also as depicted, such execution of the VM component 547 may entail execution of an interface component 5479 of the VM component 547, which may cause the instantiation and/or operation of the virtual network interfaces 793r and 793t within each of the virtual servers 700. Correspondingly, execution of the switch component 543 may cause one or more of the processor cores 555 to instantiate the virtual switch 300. Also as depicted, such execution of the switch component 543 may entail execution of an interface component 5439 of the switch component 543, which may cause the instantiation and/or operation of at least the virtual network interface 390r within the virtual switch 300. Further, such execution of the switch component 543 may entail execution of an analyzer component 5435 by one or more of the processor cores 555, which may cause instantiation and/or operation of a packet analyzer 345 in cooperation with the virtual network interface 390r.

In response to the receipt of the set of packets 130 by the virtual network interface 390r from one of the endpoint devices through the network 999 and the network interface 590r, the packet analyzer 345 may analyze the contents of at least one of the packets 131 of the set of packets 130. More specifically, the packet analyzer 345 may analyze the header 132 of one or more of the packets 131 for indication(s) of a destination address. Alternatively or additionally, the packet analyzer 345 may analyze data carried within the payload 133 of one or more of the packets 131 for indication(s) of one or more types of data and/or one or more sizes of different portions of data conveyed therein. The packet analyzer 345 may then attempt to correlate such destination address(es), type(s) of data and/or data size(s) to a known pathway by which the set of packets 130 is to proceed through one or more of the virtual servers 720. In so doing, the packet analyzer 345 may retrieve from the correlation data 535 indications of known correlations of known destination addresses, known types of data and/or known data sizes to one or more of known pathways that different sets of packets may take to determine the pathway that the set of packets 130 is to take.

Upon determining the pathway to be taken by the set of packets 130 through one or more of the virtual servers 700, the packet analyzer 345 may provide an indication of that pathway to the interface control component 549. The interface control component 549 may employ such an indication of the pathway to selectively configure the virtual network interfaces 793r and 793t of the ones of the virtual servers 700 that are along that pathway to operate in a polling mode to minimize the latencies imposed by each of those virtual network interfaces 793r and 793t as the set of packets 130 progresses along that pathway. The interface control component 549 may also employ such an indication of the pathway to selectively configure the virtual network interfaces 793r and 793t of one or more of the virtual servers 700 that are not along that pathway to operate in a non-polling mode (e.g., an inter-driven mode) to minimize the use of processing resources and electric power for virtual network interfaces that are not along that pathway.

FIG. 4B depicts an example of selecting from among at least two possible pathways that may be followed through up to four virtual servers 700 (numbered 700a through 700d) by the set of packets 130 based on a correlation found in the correlation data 535 and a destination address found within the header 132 and/or of a type or size of data found within the payload 133 of at least one of the packets 131. As depicted, a first one of the two pathways may proceed through the virtual servers 700a, 700c and 700d, while the second one of the two pathways may proceed through the virtual servers 700b and 700c. Where the packet analyzer 345 determines that the set of packets 130 is to take the first one of these two pathways, the packet analyzer 345 may cause the interface control component 549 to configure the virtual network interfaces 793r and 793t within each of the virtual servers 700a, 700c and 700d to operate in a polling mode (indicated with solid lines), while continuing to leave the virtual network interfaces 793r and 793t within the virtual server 700b operating in a non-polling mode (indicated with dashed lines). Alternatively, where the packet analyzer 345 determines that the set of packets 130 is to take the second one of these two pathways, the packet analyzer 345 may cause the interface control component 549 to configure the virtual network interfaces 793r and 793t within each of the virtual servers 700b and 700c to operate in a polling mode (indicated with solid lines), while continuing to leave the virtual network interfaces 793r and 793t within each of the virtual servers 700a and 700d operating in a non-polling mode (indicated with dashed lines).

Returning to FIG. 4A, in some embodiments, the correlation data 535 may also include indications of how long processing of the set of packets 130 takes within each of the virtual servers 700 along that pathway. The interface control component 549 may retrieve such indications from the correlation data 535 and use those indications in selectively timing when the virtual network interfaces 793r and 793t within each of the virtual servers 700 are to be operated in polling mode for when the set of packets 130 is expected to pass through each of those virtual network interfaces. Thus, instead of placing the virtual network interfaces 793r and 793t of all of the virtual servers 700 that are along that pathway in a polling mode for the entire time that the set of packets 130 progresses along that pathway, the interface control component 549 place each of those virtual network interfaces in a polling mode starting a selected amount of time ahead of when the set of packets 130 are expected to pass therethrough and/or ending a selected amount of time after when the set of packets 130 are expected to pass therethrough. In this way, it may be possible to avoid operating the virtual network interfaces 793r and 793t of all of the virtual servers 700 that are along that pathway simultaneously, thereby reducing the amount of processing resources and/or electric power required.

It should be noted that the interface control component 549 may also dynamically operate the virtual network interface 390t of the virtual switch 300 in either a polling mode or a non-polling mode based on whether there are currently any sets of packets proceeding through one or more of the virtual servers 700 such that the virtual network interface 390t will be used to transmit one or more sets of packets to the network interface 590t of the communications server 500 for transmission to an endpoint device 100 via the network 999. However, in embodiments where the interface control component 549 retrieves timing information concerning the amount of time required to process sets of packets through one or more of the virtual servers 700, the interface control component 549 may use such indications of timing to control when the virtual network interface 390t is operated in the polling mode based on when one or more sets of packets are expected to pass therethrough.

As part of so selecting virtual network interfaces to place in either a polling mode or a non-polling mode and/or as part of using such timings to do so, the interface control component 549 may retrieve from the policy data 539 indications of one or more requirements imposed on such use of a polling mode. By way of example, the policy data 539 may include an indication of a maximum number of virtual network interfaces that may be simultaneously operated in a polling mode. The interface control component 549 may respond to such a maximum number by selecting the times during which various virtual network interfaces 793r and/or 793t are operated in a polling mode to be sufficiently limited that such a maximum number is never exceeded. By way of another example, the policy data 539 may include an indication of a minimum amount of time that a virtual network interface must be placed in a polling mode ahead of when it is expected that a set of packets will pass through it. Alternatively or additionally, the policy data 539 may include an indication of a minimum amount of time that a virtual network interface must continue to be operated in a polling mode after the time during which a set of packets is no longer expected to pass through it.

In some embodiments, the communications server 500 may be provided with the correlation data 535 via the network 999 (or in some other manner) from another device. In such embodiments, and presuming that every set of packets received from an endpoint device 100 is able to be correlated to a known pathway through use of the correlation data 535 as so provided, the communications server 500 may then make use of the correlation data 535 without entering into a learning mode.

However, in other embodiments, the packet analyzer 345 may place the communications server 500 in a distinct learning mode during which the packet analyzer 345 learns the pathways taken by different sets of packets as part of learning correlations between those pathways and the contents of each of those sets of packets (e.g., destination addresses, types of data and/or sizes of portions of data). In so doing, the packet analyzer 345 may then generate the correlation data 535, itself. During such a learning mode, the packet analyzer 345 may signal the interface control component 549 to place multiple ones of the virtual network interfaces 793r and/or 793t, if not the majority or all of those virtual network interfaces, in a polling mode to ensure that latencies are minimized regardless of what pathways each set of packets may take as each progresses through one or more of the virtual servers 700. The packet analyzer 345 may continue to keep the communications server 500 in such a learning mode until one or more conditions for the cessation of such a learning mode are met, such as a predetermined number of sets of packets having been processed through the communications server 500 without any new correlations having been learned. In some embodiments, such conditions for the cessation of such a learning mode may be specified in the policy data 539 and retrieved therefrom by the packet analyzer 345. In ceasing such a learning mode, the packet analyzer 345 may signal the interface control component 549 to cease making such extensive use of polling and to switch to operating multiple ones of the virtual network interfaces 793r and/or 793t, if not the majority or all of those virtual network interfaces, in a mode other than a polling mode, thereby conserving processing resources and/or electric power. Different ones of the virtual network interfaces 793r and/or 793t may then be dynamically configured by the interface control component 549 to operate in a polling mode based on the determinations made by the packet analyzer 345 of what pathway each set of packets received from an endpoint device 100 via the network 999 is to take, as has been discussed above. However, the interface control component 549 may be caused to operate the virtual network interface 390r, by which the virtual switch 300 receives the sets of packets transmitted to the communications server 500 by the endpoint devices 100 through the network 999, continuously in a polling mode to minimize the latency with which those sets of packets are so received.

In still other embodiments, the communications server 500 may still be provided with the correlation data 535 from another device such that the communications server 500 does not enter into a learning mode to generate the correlation data 535, itself. However, in response to receiving a set of packets that the packet analyzer 345 cannot be correlate to any known pathway through its use of the correlation data 535, the packet analyzer 345 may temporarily place the communications server 500 into a learning mode throughout the time that such a received set of packets continues to be processed by one or more of the virtual servers 700. In such a temporary learning mode, multiple ones of the virtual network interfaces 793r and/or 793t, if not the majority or all of those virtual network interfaces, may be operated in a polling mode to ensure that no undue amount of latency is introduced in the processing of that set of packets as the packet analyzer 345 learns the pathway taken by that set of packets among one or more of the virtual servers 700. The packet analyzer 345 may then augment the correlation data 535 with a new correlation between the pathway taken by that set of packets and one or both of the destination address(es) that may be indicated in the headers and the type(s) of data that may be contained within the payloads of one or more of the packets in that set of packets.

Figure 5A:
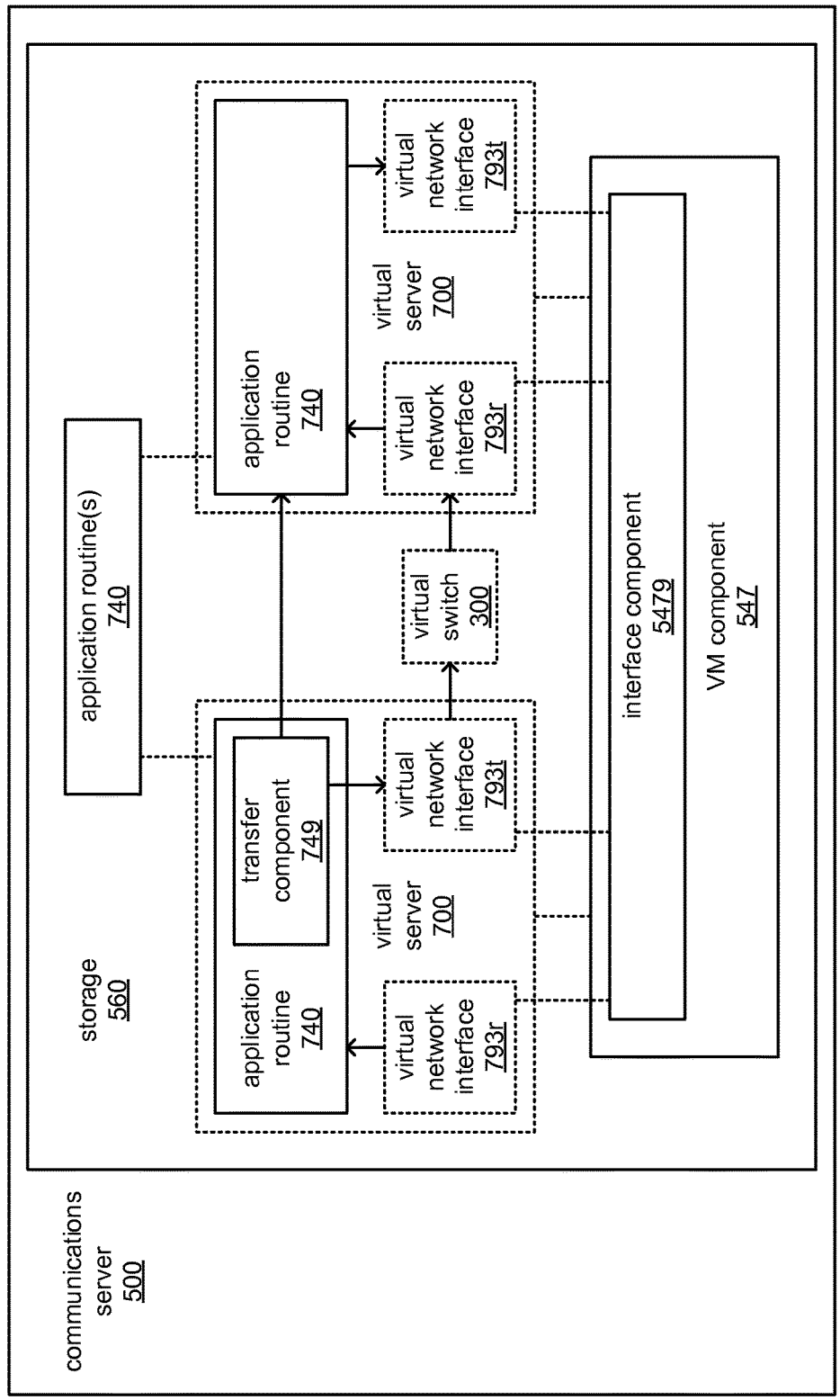
FIGS. 5A and 5B, together, illustrate an alternate example embodiment of using learned pathway of sets of packets to control virtual network interfaces.
Figure 5B:
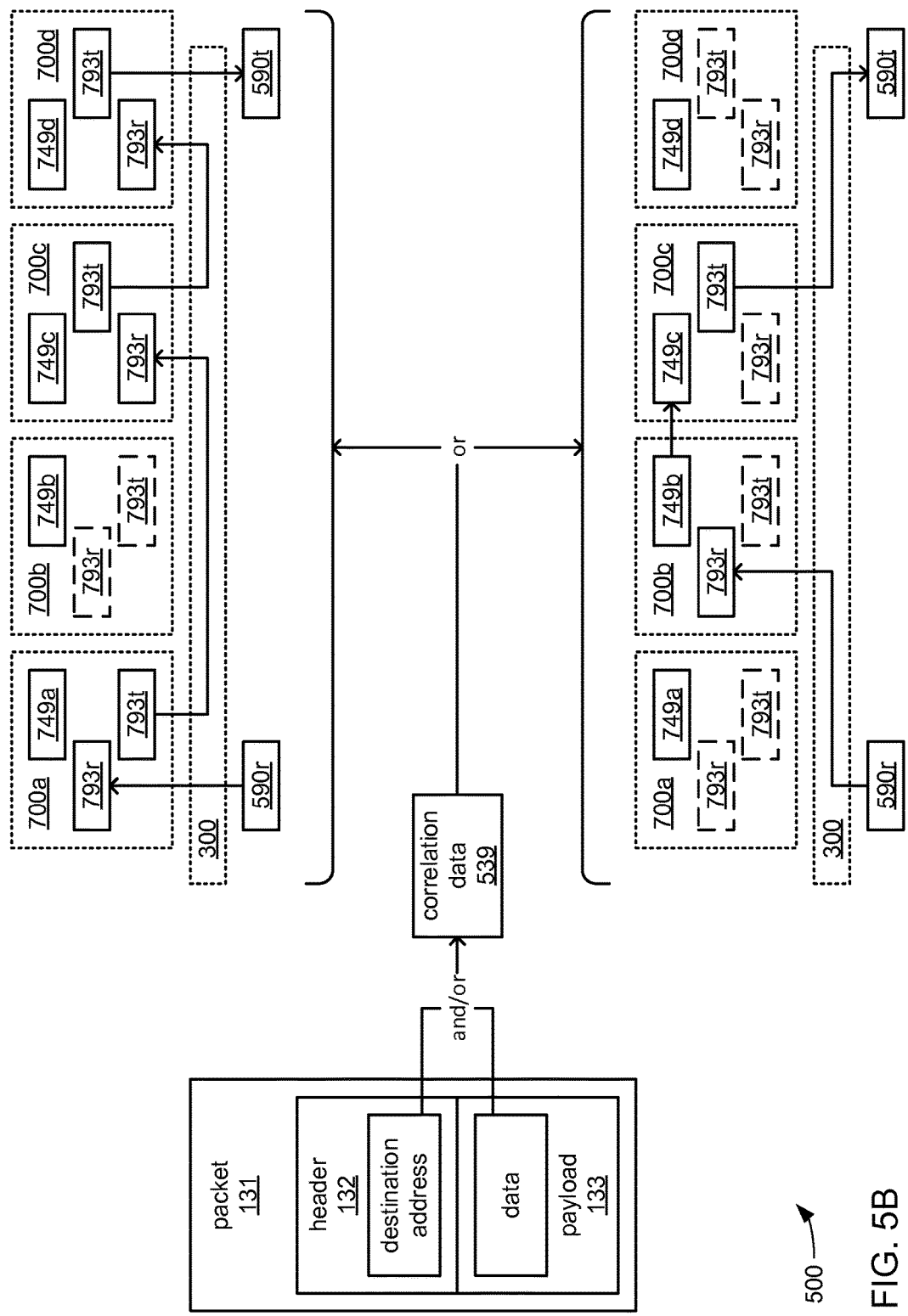

FIGS. 5A and 5B, together, depict additional aspects of the dynamic selection of different virtual network interfaces to operate in a polling mode discussed in reference to FIGS. 4A-B where at least one pair of the virtual servers 700 are able to exchange packets directly in a manner bypassing the virtual switch 300. Among those aspects is determining within one of the virtual servers 740 whether to transmit packets to another of the virtual servers 700 directly or through the virtual switch 300. Also among those aspects is dynamically configuring virtual network interfaces of one or more of the virtual servers 700 to operate in a polling mode based at least in part on which ones of the virtual servers 700 are able to exchange packets directly.

Turning to FIG. 5A, as previously discussed, different ones of the virtual servers 700 may be caused to execute a different one of the application routines 740 to perform types of processing on one or more sets of packets that are relayed between endpoint devices 100 through the communications server 500. Also as depicted, such execution of at least one of the application routines 740 within one of the virtual servers 700 may entail execution of an transfer component 749 of that one of the application routines 740 within that one of the virtual servers 700. Such execution of the transfer component 749 may cause a set of packets to be directly transmitted from that one of the virtual servers 700 to another of the virtual servers 700 in a manner that bypasses the virtual switch 300.

In some embodiments, the transfer component 749 may dynamically determine, with each set of packets, whether to transmit the set of packets to another of the virtual servers 700 directly or through the virtual switch 300 based on an analysis of at least one of the packets within the set of packets. Such an analysis may be less complex than that performed by the packet analyzer 345 of the virtual switch 300 to minimize latencies introduced through such an additional analysis performed within that one of the virtual servers 700. Thus, the transfer component 749 may not perform the type of correlation analysis that is earlier described as performed by the packet analyzer 345. By way of example, the transfer component 749 may determine which way to transmit a set of packets to another of the virtual servers 700 based on whether the header of one or more of the packets contains a destination address that is within a specific range and/or whether the payload of one or more of the packets does or does not contain a specific type of data.

FIG. 5B depicts an example, similar to that depicted in FIG. 4B, of selecting from among at least two possible pathways that may be followed through up to four virtual servers 700 (numbered 700a through 700d) by the set of packets 130 based on a correlation found in the correlation data 535 and a destination address found within the header 132 and/or of a type of data found within the payload 133 of at least one of the packets 131. As was the case in FIG. 4B, a first one of the two pathways may proceed through the virtual servers 700a, 700c and 700d, while the second one of the two pathways may proceed through the virtual servers 700b and 700c. However, FIG. 5B also specifically depicts differing ones of the application routines 740 that are executed within each of the virtual servers 700a-d, specifically application routines 740a-d, respectively. Also depicted is the ability of application routine 740b to directly transmit the set of packets 130 to application routine 740c, thereby bypassing the virtual switch 300, entirely. Thus, a portion of the second one of the two pathways is able to proceed directly from the virtual server 700b to the virtual server 700c without "looping through" the virtual switch 300.

In some embodiments, the packet analyzer 345 may take into account the ability of one or more pairs of the virtual servers 700 to directly exchange packets when selecting various ones of the virtual network interfaces 793r and/or 793t to place into a polling mode upon determining a pathway that a set of packets is to take through one or more of the virtual servers 700. It may be that the correlation data 535 and/or the policy data 539 include indications of which ones of the virtual servers 700 are able to engage in such a direct exchange of packets. Such indications may also specify various conditions under which such a direct exchange of a set of packets may take place in lieu of exchanging that set of packets through the virtual switch 300.

Therefore, where the packet analyzer 345 determines that the set of packets 130 is to take the first one of these two pathways, the packet analyzer 345 may cause the interface control component 549 to configure the virtual network interfaces 793r and 793t within each of the virtual servers 700a, 700c and 700d to operate in a polling mode (indicated with solid lines), while continuing to leave the virtual network interfaces 793r and 793t within the virtual server 700b operating in a non-polling mode (indicated with dashed lines). This is unchanged from what was shown in FIG. 4B. However, where the packet analyzer 345 determines that the set of packets 130 is to take the second one of these two pathways, the packet analyzer 345 may cause the interface control component 549 to configure the virtual network interface 793r within the virtual server 700b and the virtual network interface 793t within the virtual server 700c to operate in a polling mode (indicated with solid lines), while continuing to leave the virtual network interface 793t of the virtual server 700b, the virtual network interface 793r of the virtual server 700c, and both of the virtual network interfaces 793r and 793t within each of the virtual servers 700a and 700d operating in a non-polling mode (indicated with dashed lines). Thus, unlike what was depicted in FIG. 4B, the ability of the virtual server 700b to directly transmit packets to the virtual server 700c without involving the virtual switch 300 enables the virtual network interface 793t of the virtual server 700b and the virtual network interface 793r of the virtual server 700c to continue to operate in a non-polling mode, thereby reducing processing requirements and/or electric power consumption.

Figure 6:
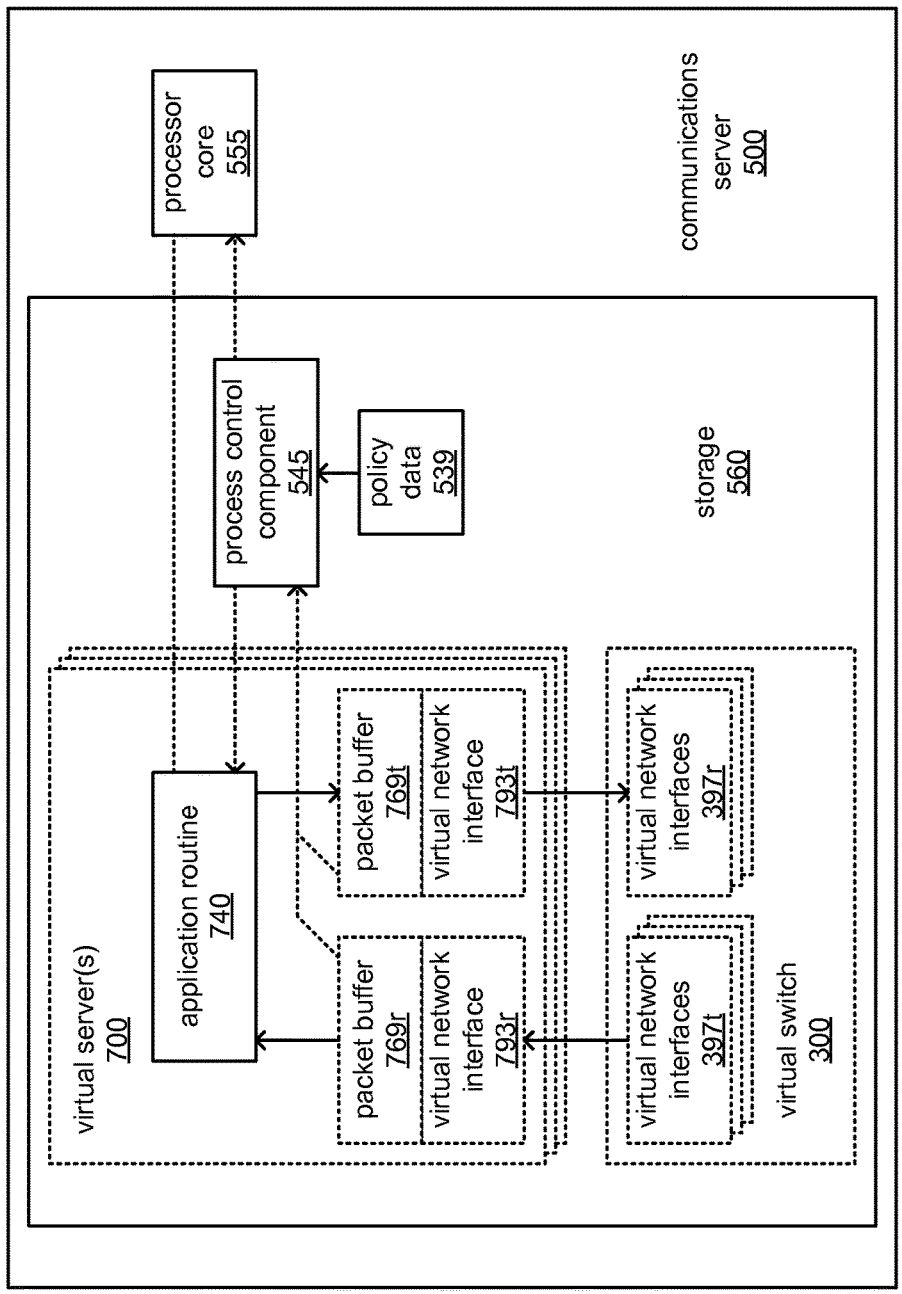
FIG. 6 illustrates an example embodiment of monitoring levels of fullness of packet buffers.

FIG. 6 depicts aspects of controlling the rate of processing of packets within one of the virtual servers 700. In various embodiments, one or more of the virtual network interfaces 793r and/or 793t may be paired with a packet buffer 769r and/or 769t, respectively, to buffer packets as they are received by one or more of the virtual servers 700 for processing and/or as they are transmitted by one or more of the virtual servers 700 following processing. Further, the degree to which each of the buffers 769r and/or 769t are full may be monitored, and the rate at which packets are processed by the application routine 740 executed within each of the virtual servers 700 may be varied based on the degree to which each of those buffers are full to at least minimize instances of buffer overflow and/or underflow.

In some embodiments, within each of the virtual servers 700, execution of the application routine 740 by one or more of the processor cores 555 may cause monitoring of the degree of fullness of the buffers 769r and/or 769t under the control of that one or more processor cores 555. In response to the level of fullness of one or the other of these two buffers exceeding and/or falling below a threshold, the one or more processor cores 555 that execute the application routine 740 may be caused to execute instructions other than those of the application routine 740 that perform processing operations on packets. More specifically, the relative amounts of instructions of the application routine 740 that are associated with processing packets and of the other instructions may be varied to increase or decrease the rate at which the instructions of the application routine 740 associated with processing packets may be executed at a greater or lesser pace to accordingly increase or decrease the rate at which packets are processed.

In other embodiments, indications of the degree of fullness of the buffers 769r and/or 769t within each of the virtual servers 700 may be recurringly provided to the process control component 545 of the control routine 540. The process control component 545 may then signal one or more of the application routines 740 executed within corresponding one(s) of the virtual servers 700 to increase and/or decrease the rate at which packets are processed by varying the relative quantities of instructions associated with processing packet and instructions that are not, as just described. Alternatively, the process control component 545 may then signal one or more of the processor cores 555 that execute one or more of the application routine 740 within one or more of the virtual servers 700 to vary the speed at which instructions of the one or more of the application routines 740 are executed.

Regardless of the exact manner in which the rate of processing of packets may be varied, the policy data 539 may include indications of the threshold(s) against which the degrees of fullness of each of the buffers 769r and 769t are recurringly compared to determine whether a buffer overflow and/or underflow is about to occur. Where the process control component 545 receives indications of the degree of fullness of each of these buffers, the process control component 545 may retrieve and directly use such indications from the policy data 539. However, where the individual application routines 740 are provided with such indications of fullness, the process control component 545 may relay such indications of threshold(s) to each of the application routines 740.

Figure 7A:
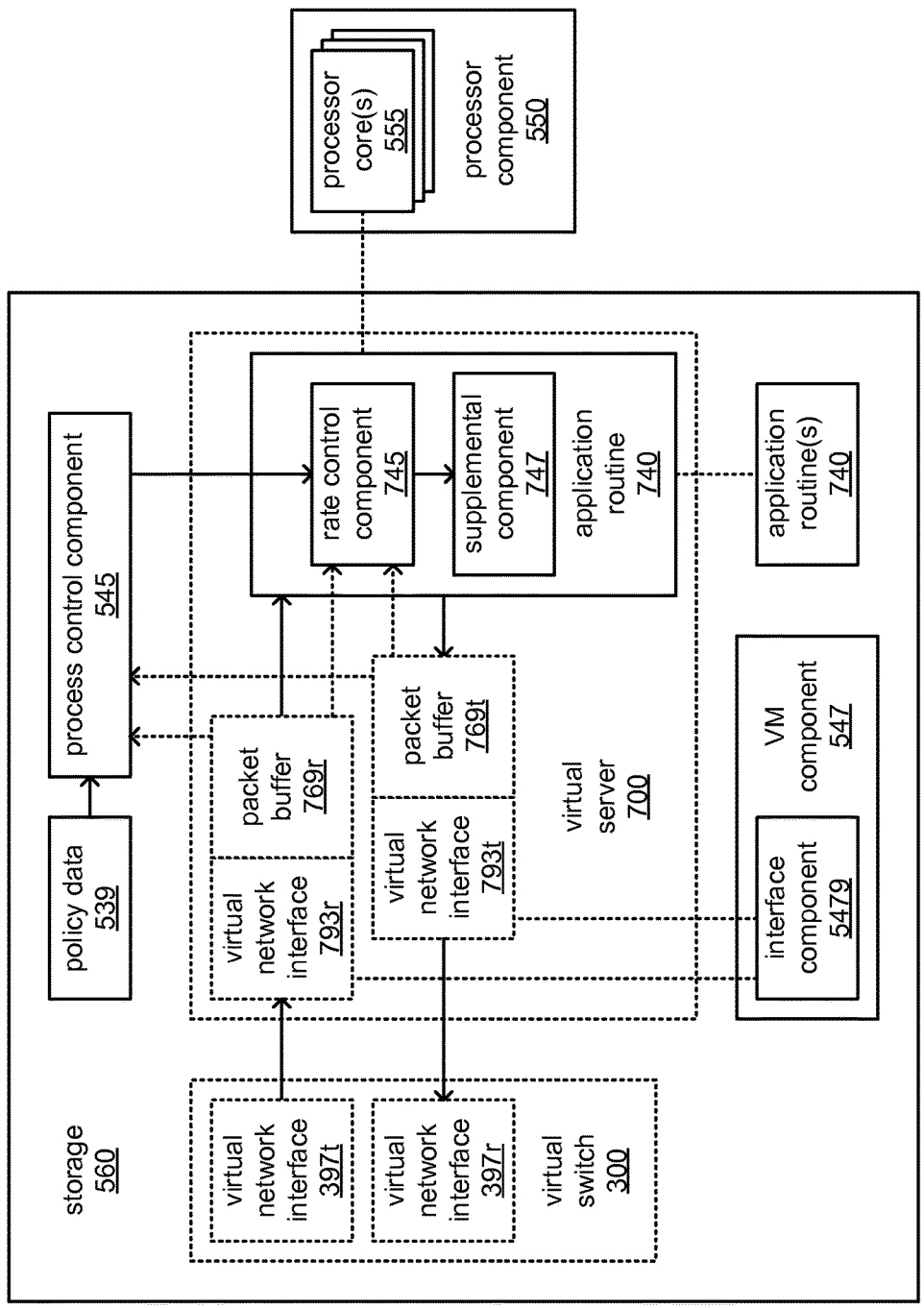
FIGS. 7A and 7B each illustrate an example embodiment of using levels of fullness of packet buffers to control a rate at which packets are processed.
Figure 7B:
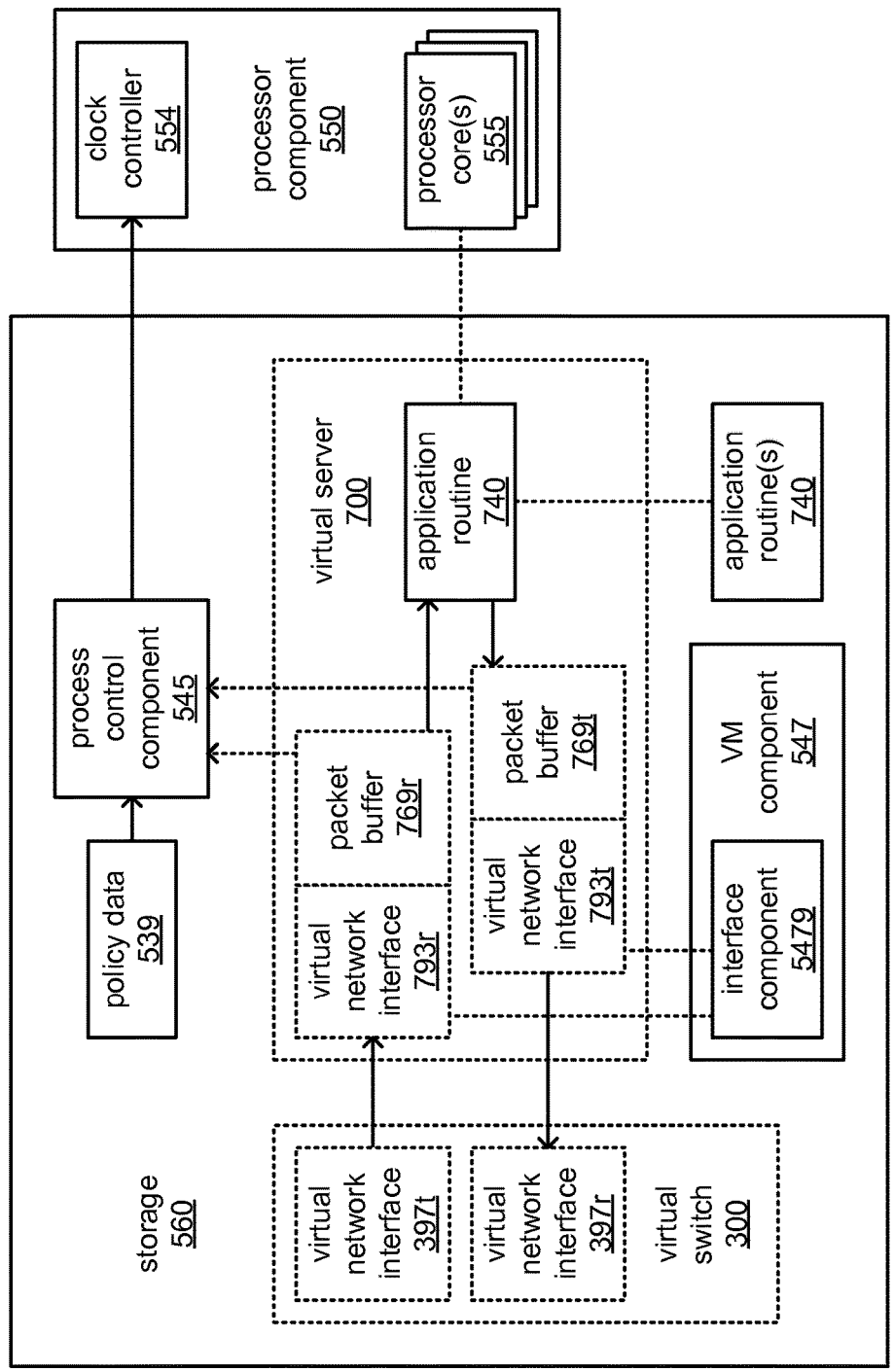

FIGS. 7A and 7B, together, depict aspects of controlling the rate at which packets are processed within one of the virtual servers 700 based on the degree of fullness of one or more buffers in greater detail. Among those aspects are monitoring the level of fullness in at least one of the buffers 769r and 769t, and recurringly comparing the level of fullness to one or more thresholds. Also among those aspects is either changing what instructions are executed within one of the virtual servers 700 or changing the rate at which instructions are executed within one of the virtual servers 700 based on the results of the recurring comparison.

Turning to FIG. 7A, as previously discussed, execution of the VM component 547, including execution of the interface component 5479, may cause one or more of the processor cores 555 to instantiate one or more VMs 567 and to configure each of those VMs 567 as an instance of a virtual server 700 that includes the virtual network interfaces 793r and 793t. As depicted, each of the virtual network interfaces 793r and 793t may incorporate or otherwise be associated with a buffer 769r and 769t, respectively. As previously discussed, different ones of the virtual servers 700 may be caused to execute a different one of the application routines 740 to perform types of processing on sets of packets. Also as depicted, such execution of at least one of the application routines 740 within one of the virtual servers 700 may entail execution of a rate control component 745 of that one of the application routines 740 within that one of the virtual servers 700. Such execution of the rate control component 745 may cause changes to the rate of processing of such sets of packets as a result of the execution of that application routine 740.

In some embodiments, as packets received by the virtual network interface 793r are buffered within the buffer 769r prior to being emptied therefrom by the application routine 740 for processing, and as packets processed by the application routine 740 are placed in the buffer 769t for transmission by the virtual network interface 793t, the degree of fullness of each of the buffers 769r and 769t is recurringly monitored by the rate control component 745. The rate control component 745 may receive indications of thresholds against which to compare these degrees of fullness from the process control component 545, which may retrieve those thresholds from the policy data 539. If, through such recurring comparisons, the rate control component 745 determines that the rate at which packets are processed through execution of instructions of the application routine 740 is to be changed, the rate control component 745 may cause execution of more or less of the instructions of a supplemental component 747 of the application routine 740. The instructions of the supplemental component 747 cause the performance of one or more tasks other than processing packets by the one or more processor cores 555 that execute the instructions of the application routine 740 that do process packets. Stated differently, the rate control component 745 may cause execution of more of the instructions of the supplemental component to thereby bring about execution of less of the instructions of the application routine 740 associated with processing packets as a mechanism to reduce the rate at which packets are processed. Conversely, the rate control component 745 may cause execution of less of the instructions of the supplemental component to thereby bring about execution of more of the instructions of the application routine 740 associated with processing packets as a mechanism to increase the rate at which packets are processed. The one or more tasks caused to be performed by the instructions of the supplemental component 747 may be entirely unrelated to the processing of packets (e.g., one or more loops of logical and/or arithmetic operations selected to consume processing resources), or may bear some relationship to the processing of packets (e.g., deriving one or more metrics associated with the processing of packets).

Thus, by way of example, as the degree of fullness of the buffer 769r falls below a threshold associated with buffer underflow or as the degree of fullness of the buffer 769t rises above a threshold associated with buffer overflow, the rate control component 745 may determine that the rate at which packets are processed is to be reduced. The rate control component 745 may then effect a reduction in the rate at which instructions of the application routine 740 associated with processing packets are executed by causing more of the instructions of the supplemental component 747 to be executed. As a result, the buffer 769r may be emptied of received packets to be processed at a lesser rate, and/or the buffer 769t may be filled with processed packets to be transmitted at a lesser rate. Conversely, and also by way of example, as the degree of fullness of the buffer 769r rises above a threshold associated with buffer overflow or as the degree of fullness of the buffer 769t falls below a threshold associated with buffer underflow, the rate control component 745 may determine that the rate at which packets are processed is to be increased. The rate control component 745 may then effect an increase in the rate at which instructions of the application routine 740 associated with processing packets are executed by causing fewer of the instructions of the supplemental component 747 to be executed. As a result, the buffer 769r may be emptied of received packets to be processed at a greater rate, and/or the buffer 769t may be filled with processed packets to be transmitted at a greater rate.

In other embodiments, as packets received by the virtual network interface 793r are buffered within the buffer 769r prior to being emptied therefrom by the application routine 740 for processing, and as packets processed by the application routine 740 are placed in the buffer 769t for transmission by the virtual network interface 793t, the degree of fullness of each of the buffers 769r and 769t is recurringly provided to the process control component 545. Again, the process control component 545 may retrieve indications of thresholds against which to compare these degrees of fullness from the policy data 539. However, it may be the process control component 545 that performs the recurring comparisons of these degrees of fullness to such thresholds. If, through such recurring comparisons, the process control component 545 determines that the rate at which packets are processed through the application routine 740 is to be changed, the process control component 545 may signal the rate control component 745 within that application routine 740 to change that rate. In response to such a signal, the rate control component 745 may take action to adjust the rate of execution of instructions of the application routine 740 that are associated with processing packets in the manner described earlier.

Turning to FIG. 7B, as depicted, at least one of the processor components 550 from which one or more processor cores 555 are allocated to execute instructions of the application routine 740 may incorporate a clock controller 554. The clock controller 554 may control the frequency of the processor clock used as an input by one or more of those processor cores 555 to time various aspects of their execution of the instructions of the application routine 740.

Again, as packets received by the virtual network interface 793r are buffered within the buffer 769r prior to being emptied therefrom by the application routine 740 for processing, and as packets processed by the application routine 740 are placed in the buffer 769t for transmission by the virtual network interface 793t, the degree of fullness of each of the buffers 769r and 769t may be recurringly provided to the process control component 545. And again, the process control component 545 may retrieve indications of thresholds against which to compare these degrees of fullness from the policy data 539. However, instead of signaling any part of the application routine 740 to effect a change in the rate at which packets are processed, the process control component 545 may signal the one or more processor components 550 from which processor core(s) 555 are allocated to execute the instructions of the application routine 740 to effect a change in the rate at which instructions of the application routine 740 are executed by those processor core(s) 555.

More specifically, the process control component 545 may signal the clock controller 554 to reduce the frequency of that processor clock to slow the rate of execution of instructions of the application routine 740 and accordingly slow the rate of processing of packets, or to increase the frequency of that processor clock to increase the rate of execution of instructions of the application routine 740 and accordingly increase the rate of processing of packets.

Figure 8:
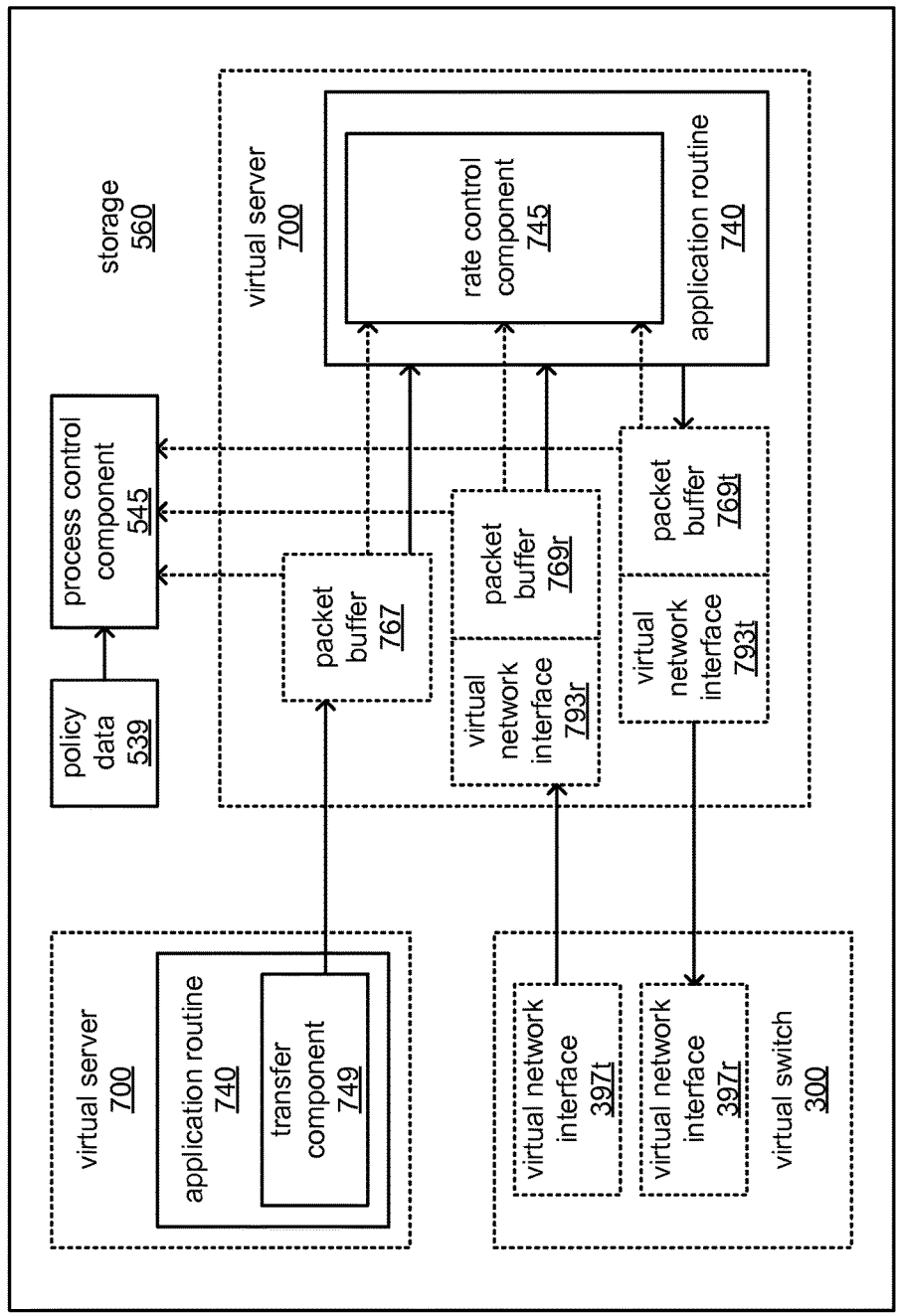
FIG. 8 illustrates an alternate example embodiment of using levels of fullness of packet buffers to control a rate at which packets are processed.

FIG. 8 depicts additional aspects of controlling the rate at which packets are processed as discussed in reference to FIGS. 7A-B where at least one pair of the virtual servers 700 are able to exchange packets directly in a manner bypassing the virtual switch 300. Among those aspects are monitoring the level of fullness in a buffer by which one of the virtual servers 700 may directly receive packets from another of the virtual servers 700, and recurringly comparing the level of fullness to one or more thresholds. Also, again among those aspects is either changing what instructions are executed within one of the virtual servers 700 or changing the rate at which instructions are executed within one of the virtual servers 700 based on the results of the recurring comparison.

In various embodiments, execution of the VM component 547 and/or of at least one of the application routines 740 may result in the instantiation of two of the virtual servers 700 with an ability for those two virtual servers 700 to have access to an amount of shared memory. As depicted, in some embodiments, this shared memory may be utilized in a manner that defines another buffer 767 by which the transfer component 749 of the application routine 740 of one of the two virtual servers 700 is able to provide packets to the application routine 740 of the other of the two virtual servers 700. In such embodiments, the rate control component 745 of the application routine 740 executed within the receiving one of these two virtual servers 700 may monitor the level of fullness of packets within the buffer 767. The rate control component 745 may recurringly compare that level of fullness to one or more thresholds and act on the results of those comparisons in a manner similar to what has been described above for the buffers 769r and 769t, such that a level of fullness falling below a buffer underflow threshold or rising above a buffer overflow threshold may be responded to by varying the rate at which packets are processed by the application routine 740. Alternatively, indications of the level of fullness of the buffer 767 may be recurringly provided to the process control component 545 to enable the process control component 545 to perform such recurring comparisons and to take such action as has been described to vary the rate at which packets are processed by the application routine 740.

In still other embodiments, instead of a separate buffer 767 being created, the amount of memory that is shared between the two virtual servers 700 may be defined to coincide with the location of the buffer 769r of the one of these two virtual servers 700 that receives packets transmitted directly to it by the transfer component 749 within the other. In such other embodiments, the buffer 769r would remain the buffer by which the receiving one of these two virtual servers 700 receives packets, regardless of whether they are received directly from the other virtual server 700 or through the virtual switch 300.

In various embodiments, the processor component 550 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, the storage 560 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, at least a portion of the interface(s) 590 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 9:
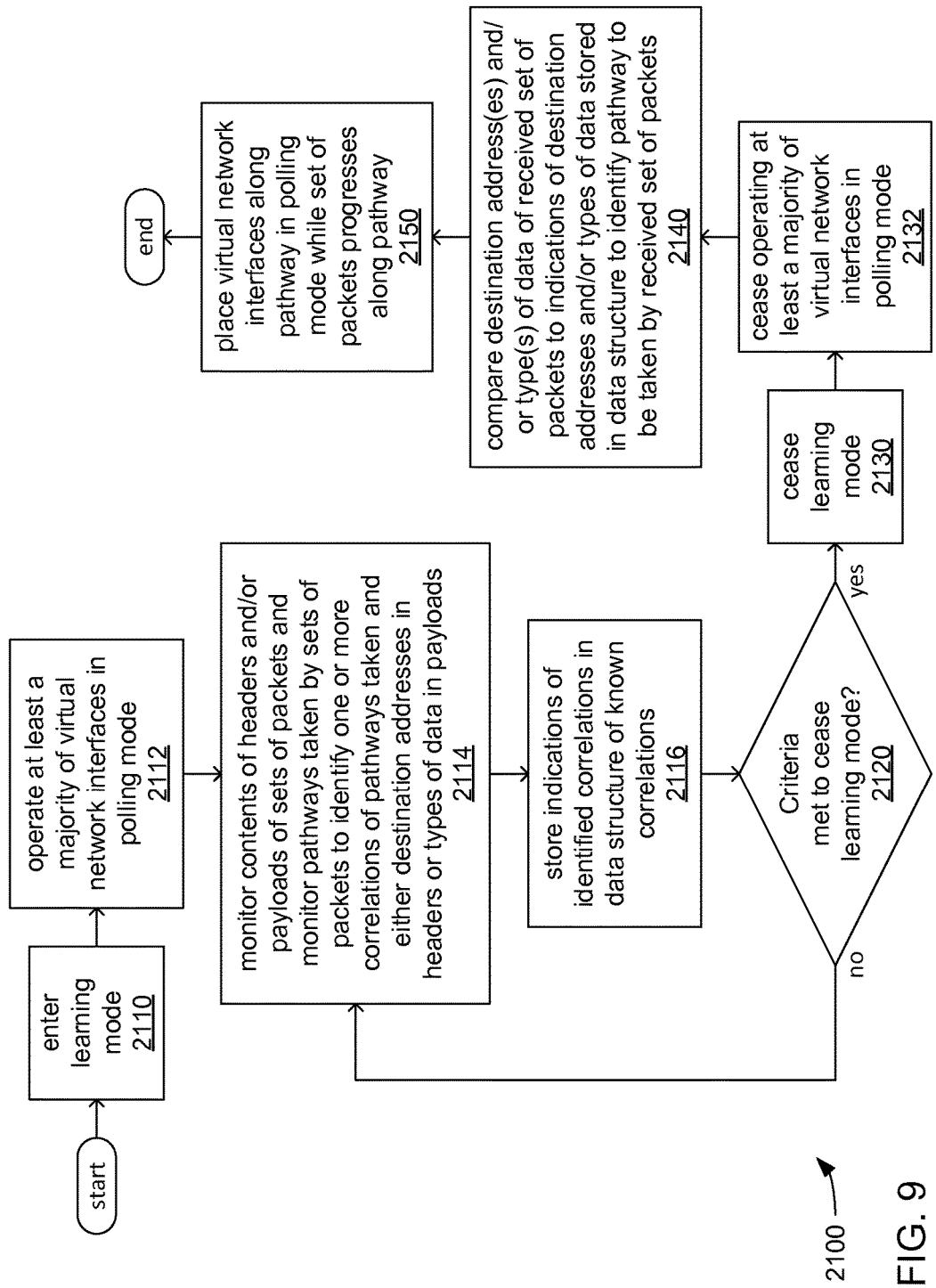
FIGS. 9, 10, 11 and 12 each illustrates a logic flow according to an embodiment.

FIG. 9 illustrates an embodiment of a logic flow 2100. The logic flow 2100 may be representative of some or all of the operations executed by one or more embodiments described herein. More specifically, the logic flow 2100 may illustrate operations performed by one or more of the processor components 550 in executing at least the control routine 540, and/or performed by other component(s) of the communications server 500. In particular, the logic flow 2100 is focused on operations to route packets in greater detail.

At 2110, at least one processor core of at least one processor component of a communications server places the communications server in a learning mode (e.g., at least one processor core 555 of at least one of the processor components 550 of the communications server 500). At 2112, as part of doing so, the at least one processor core triggers the operation of at least a majority of the virtual network interfaces of multiple virtual servers in polling mode (e.g., the virtual network interfaces 793r and 793t of the virtual servers 700). As has been discussed, operation of one of the virtual network interfaces in a polling mode may entail dedicating a processor core to continuously executing instructions implementing that virtual network interface to recurringly poll for the arrival of packets to be passed through that virtual network interface (e.g., separate ones of the processor cores 555 each dedicated to executing the interface component 5479 to implement polling at one of the virtual network interfaces 793r or 793t).

At 2114, as part of operating in learning mode, a packet analyzer of a virtual switch implemented within the communications server by the at least one processor core monitors the contents of headers and/or payloads in one or more packets of each set of packets received by the communications server and at a virtual network interface of the virtual switch (e.g., the packet analyzer 345 and the virtual network interface 390r of the virtual switch 300). As previously discussed, the particular contents of the headers so monitored may be indications of destination addresses, and/or the particular contents of the payloads so monitored may be the size and/or type of data conveyed. The packet analyzer may receive indications of the pathway taken by each of the received sets of packets through one or more of the virtual servers, and may correlate the contents of headers and/or payloads (e.g., the destination addresses, data types and/or data sizes) to the pathways. At 2116, the packet analyzer may store indications of such correlations as part of a data structure of known correlations (e.g., the correlation data 535).

At 2120, the at least one processor core, in implementing the packet analyzer, the at least one processor core may determine whether or not selected criteria have been met to cease the learning mode. As previously discussed, such criteria may include a selected number of sets of packets having been received by the communications server at the virtual switch and having progressed through one or more of the virtual servers without taking a pathway that is not already known. If such criteria have not yet been met at 2120, then further monitoring of contents of one or more packets of each received set of packets and further monitoring of pathways taken by each received set of packets may continue at 2114.

However, if such criteria have been met at 2120, then the at least one processor component may take the communications server out of the learning mode at 2130. At 2132, as part of doing so, the at least one processor core triggers the cessation of operation of at least a majority of the virtual network interfaces of multiple virtual servers in polling mode. As has been discussed, although the operation of virtual network interfaces in polling mode minimizes latencies for packets conveyed therethrough, the dedication of a separate processor core to each of multiple virtual network interfaces results in a continuous consumption of considerable processing resources regardless of whether there are any packets passing through any virtual network interface, or not. As also previously discussed, such use of multiple processor cores may also consume a considerable amount of electric power. With the cessation of the learning mode, the indications of correlations to known pathways earlier stored within the data structure may be then be used to minimize latencies for sets of packets that progress along different pathways without requiring the majority or all of the virtual network interfaces of the virtual servers to be operated in a polling mode, as has been discussed previously.

Following cessation of the learning mode, at 2140, the packet analyzer may analyze the contents and/or payload of one or more packets of a set of packets received at the communications server by the virtual switch, and may compare one or more of those contents to indications of contents correlated with known pathways in the data structure to identify a known pathway that correlates to the contents of the received set of packets. At 2150, the at least one processor core may place virtual network interfaces of the one or more virtual servers that are along the identified pathway of the received set of packets in a polling mode, while avoiding placing the virtual network interfaces of others of the virtual servers that are not along the identified pathway into a polling mode.

Figure 10:
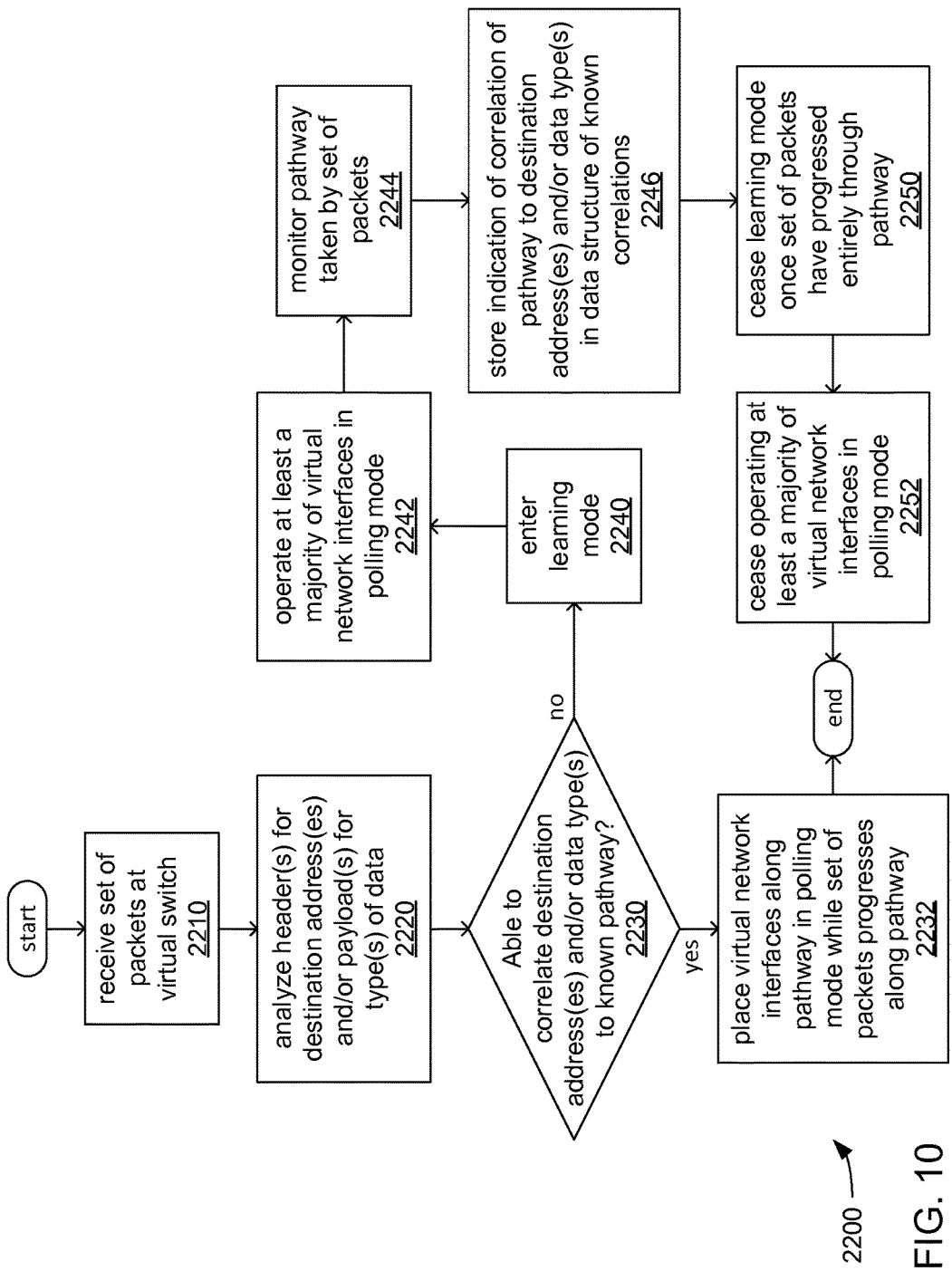

FIG. 10 illustrates an embodiment of a logic flow 2200. The logic flow 2200 may be representative of some or all of the operations executed by one or more embodiments described herein. More specifically, the logic flow 2200 may illustrate operations performed by one or more of the processor components 550 in executing at least the control routine 540, and/or performed by other component(s) of the communications server 500. In particular, the logic flow 2200 is focused on operations to route packets in greater detail.

At 2210, at least one processor core of at least one processor component of a communications server (e.g., at least one processor core 555 of at least one of the processor components 550 of the communications server 500) receives a set of packets through a network interface of the communications server (e.g., the network interface 590r) and at a virtual network interface of a virtual switch generated within the communications server by the at least one processor core (e.g., the virtual network interface 390r of the virtual switch 300). As previously discussed, one or more processor cores of a communications server may generate a virtual switch within the communications server to replace a physically distinct network switch in support of routing sets of packets among multiple VMs that are each configured as one of multiple virtual servers within the communications server to replace multiple physically distinct servers (e.g., the multiple VMs 567 that are each configured as one of the multiple virtual servers 700).

At 2220, a packet analyzer of the virtual switch may analyze the contents and/or payload of one or more packets of the received set of packets (e.g., the destination addresses, data types and/or data sizes thereof), and may compare one or more of those contents to indications of contents previously correlated with known pathways to attempt to identify a known pathway that correlates to the contents of the received set of packets. As previously discussed, through such an effort to correlate such contents of a received set of packets to a known pathway, it may be possible to identify the pathway that will be taken by that set of packets through one or more of the virtual servers.

If, at 2230, the packet analyzer is able to identify such a pathway, then at 2232, the at least one processor core may place virtual network interfaces of the one or more virtual servers (e.g., the virtual network interfaces 793r and/or 793t)

that are along that identified pathway in a polling mode, while avoiding placing the virtual network interfaces of others of the virtual servers that are not along that identified pathway into a polling mode. As has been discussed, operation of one of the virtual network interfaces in a polling mode may entail dedicating a processor core to continuously executing instructions implementing that virtual network interface to recurringly poll for the arrival of packets to be passed through that virtual network interface as part of minimizing latencies imposed on packets that pass therethrough.

However, if at 2240, the packet analyzer is not able to identify such a pathway from among those known pathways, then the at least one processor core may temporarily place the communications server in a learning mode. At 2242, as part of doing so, the at least one processor core triggers the operation of at least a majority of the virtual network interfaces of multiple virtual servers in polling mode. At 2244, during such a learning mode, the packet analyzer may receive indications of the pathway taken by the received sets of packets through one or more of the virtual servers, and may correlate the contents of the headers and/or payloads of one or more of the packets of that received set of packets to that pathway. At 2246, the packet analyzer may store indications of that correlation as part of a data structure of known correlations (e.g., the correlation data 535).

At 2250, with the receive set of packets having progressed along its pathway, the at least one processor component may take the communications server out of the learning mode. At 2252, as part of doing so, the at least one processor core triggers the cessation of operation of at least a majority of the virtual network interfaces of multiple virtual servers in polling mode.

Figure 11:
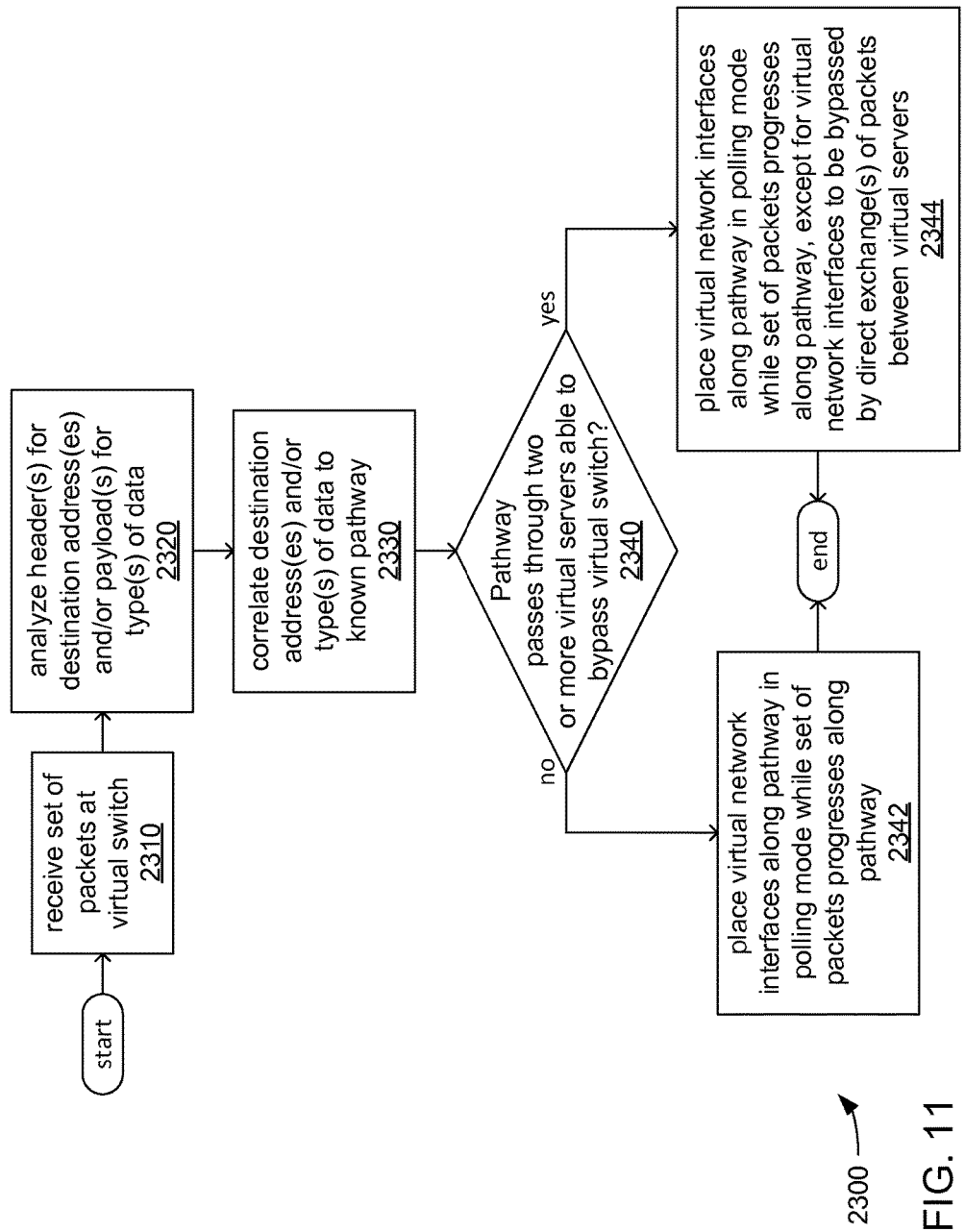

FIG. 11 illustrates an embodiment of a logic flow 2300. The logic flow 2300 may be representative of some or all of the operations executed by one or more embodiments described herein. More specifically, the logic flow 2300 may illustrate operations performed by one or more of the processor components 550 in executing at least the control routine 540, and/or performed by other component(s) of the communications server 500. In particular, the logic flow 2300 is focused on operations to route packets in greater detail.

At 2310, at least one processor core of at least one processor component of a communications server (e.g., at least one processor core 555 of at least one of the processor components 550 of the communications server 500) receives a set of packets through a network interface of the communications server (e.g., the network interface 590*r*) and at a virtual network interface of a virtual switch generated within the communications server by the at least one processor core (e.g., the virtual network interface 390*r* of the virtual switch 300). As previously discussed, one or more processor cores of a communications server may generate a virtual switch within the communications server to replace a physically distinct network switch in support of routing sets of packets among multiple VMs that are each configured as one of multiple virtual servers within the communications server to replace multiple physically distinct servers (e.g., the multiple VMs 567 that are each configured as one of the multiple virtual servers 700).

At 2320, a packet analyzer of the virtual switch may analyze the contents and/or payload of one or more packets of the received set of packets (e.g., the destination addresses, data types and/or data sizes thereof), and may compare one or more of those contents to indications of contents previously correlated with known pathways to identify a known pathway that correlates to the contents of the received set of packets, and by which the received set of packets may proceed through one or more of the virtual servers at 2330. At 2340, upon identifying such a known pathway, the packet analyzer may check whether the known pathway passes through two or more virtual servers that are able to cooperate to implement a portion of that pathway between them in a manner that bypasses the virtual switch. As has been discussed, there may be one or more pairs of the virtual servers that are able to cooperate through a portion of shared memory to directly exchange packets in a manner that is entirely independent of the virtual switch.

If, at 2340, there are no such pairs of the virtual servers along the identified pathway, then at 2342, the at least one processor core may place virtual network interfaces of the one or more virtual servers (e.g., the virtual network interfaces 793*r* and/or 793*t*) that are along that identified pathway in a polling mode, while avoiding placing the virtual network interfaces of others of the virtual servers that are not along that identified pathway into a polling mode. As has been discussed, placing the virtual network interfaces that are along the identified pathway in a polling mode while avoiding placing others of the virtual network interfaces that are not along the identified pathway in a polling mode minimizes latencies imposed on the received set of packets as they pass through the virtual network interfaces along the identified pathway, while also avoiding unnecessarily dedicating whole processor cores to supporting a polling mode at virtual network interfaces that are not along the identified pathway.

However, if at 2340, there are one or more of such pairs of the virtual servers along the identified pathway, then at 2344, the at least one processor core may place virtual network interfaces of the one or more virtual servers that are along that identified pathway in a polling mode, except for the virtual network interfaces of those virtual servers that will not be used as a result of such direct exchanges of the set of packets between the virtual servers in each of those pairs of virtual servers. Again, the at least one processor core may also avoid placing the virtual network interfaces of others of the virtual servers that are not along that identified pathway into a polling mode.

Figure 12:
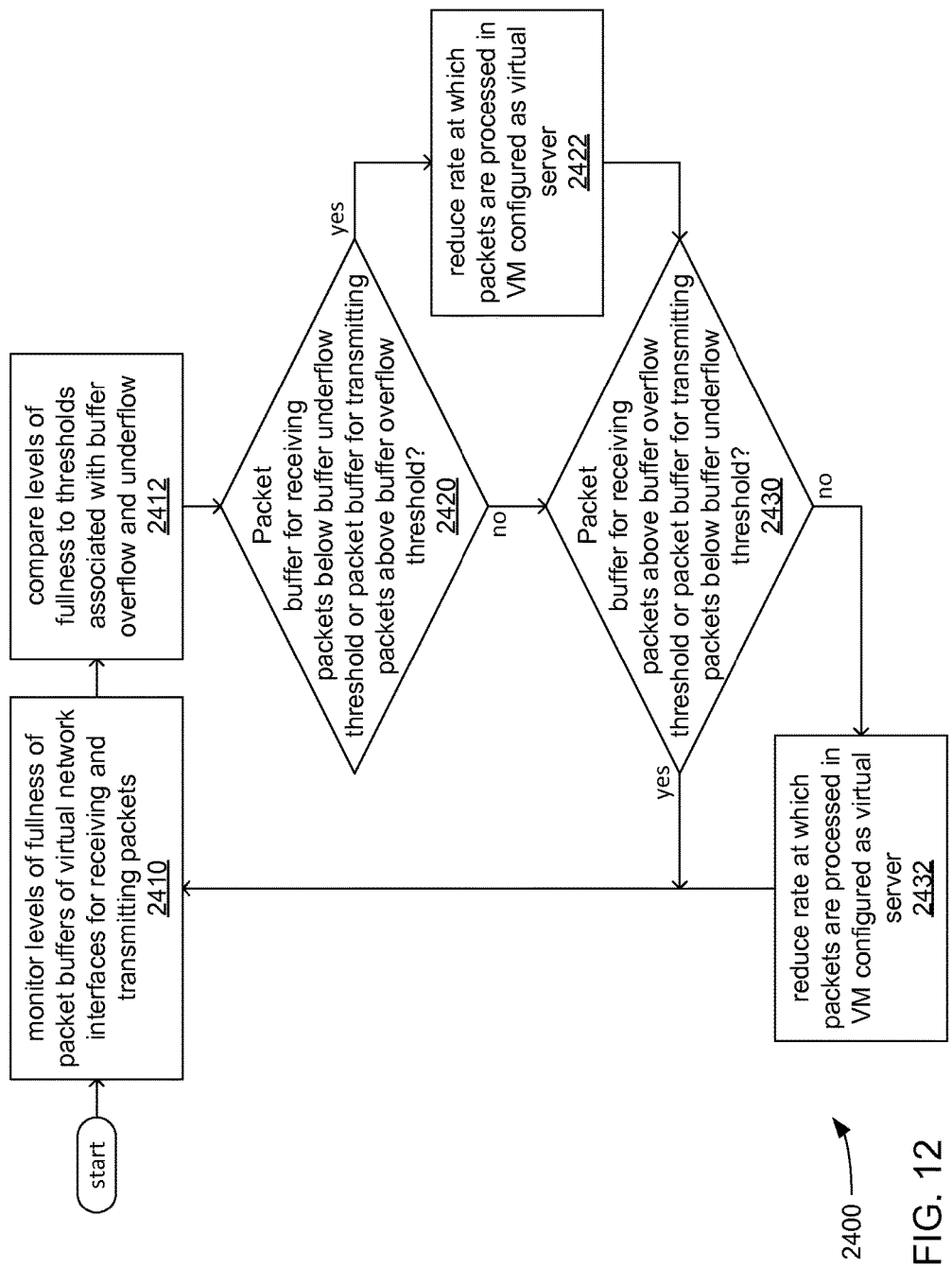

FIG. 12 illustrates an embodiment of a logic flow 2400. The logic flow 2400 may be representative of some or all of the operations executed by one or more embodiments described herein. More specifically, the logic flow 2400 may illustrate operations performed by one or more of the processor components 550 in executing at least the control routine 540, and/or performed by other component(s) of the communications server 500. In particular, the logic flow 2400 is focused on operations to route packets in greater detail.

At 2410, at least one processor core of at least one processor component of a communications server (e.g., at least one processor core 555 of at least one of the processor components 550 of the communications server 500) monitors levels of fullness of packet buffers of virtual network interfaces of a virtual server (e.g., the virtual network interfaces 793*r* and 793*t*, and corresponding packet buffers 769*r* and 769*t* of one of the virtual servers 700) that are used to receive and send packets. At 2412, the at least one processor core may compare those levels of fullness to one or more thresholds associated with buffer overflow and/or underflow conditions. As has been discussed, it may be either a portion of an application routine executed by the at least one processor core within the virtual server (e.g., the rate control component 745 of one of the application routines 740) or a portion of a control routine executed by the at least one processor core externally of the virtual server (e.g., the process control component 545 of the control routine 540) that monitors levels of fullness and performs such comparisons of levels of fullness to thresholds.

At 2420, a check may be made to determine if the level of fullness of the packet buffer for receiving packets has fallen below a threshold associated with buffer underflow and/or if the level of fullness of the packet buffer for transmitting packets has risen above a threshold associated with buffer overflow. If either condition is true, then the at least one processor core may act at 2422 to reduce the rate at which packets are processed by reducing the rate of execution of instructions of the application routine within the virtual server to cause a corresponding reduction in the rate at which the packet buffer for receiving packets is emptied and/or the rate at which the packet buffer for transmitting packets is filled.

Regardless of the result of the check made at 2420, at 2430, another check may be made to determine if the level of fullness of the packet buffer for receiving packets has risen above a threshold associated with buffer overflow and/or if the level of fullness of the packet buffer for transmitting packets has fallen below a threshold associated with buffer underflow. If either condition is true, then the at least one processor core may act at 2432 to increase the rate at which packets are processed by increasing the rate of execution of instructions of the application routine within the virtual server to cause a corresponding increase in the rate at which the packet buffer for receiving packets is emptied and/or the rate at which the packet buffer for transmitting packets is filled.

Figure 13:
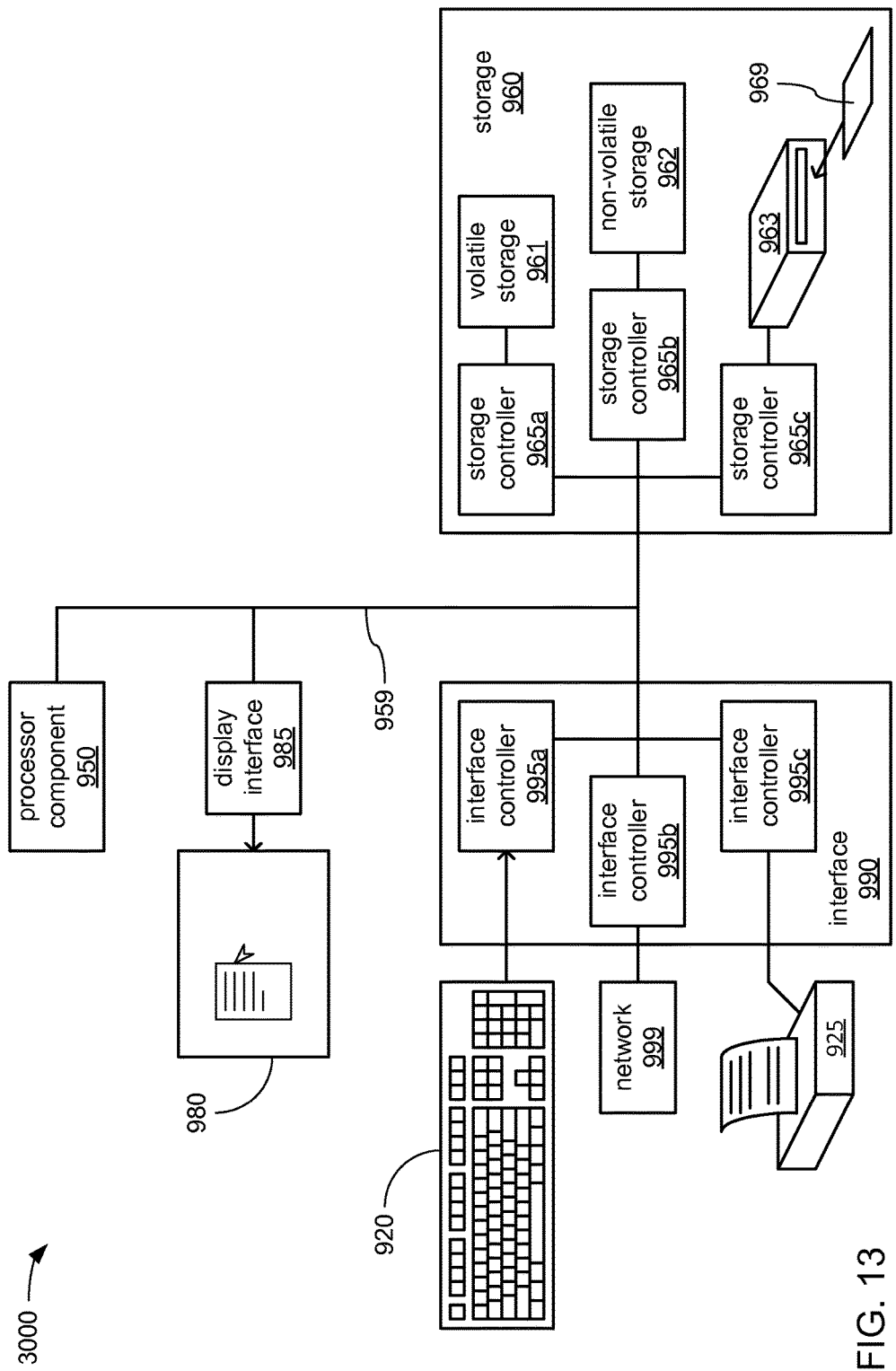
FIG. 13 illustrates a processing architecture according to an embodiment.

FIG. 13 illustrates an embodiment of an exemplary processing architecture 3000 suitable for implementing various embodiments as previously described. More specifically, the processing architecture 3000 (or variants thereof) may be implemented as part of one or more of the computing devices 100, 400 or 800. It should be noted that components of the processing architecture 3000 are given reference numbers in which the last two digits correspond to the last two digits of reference numbers of at least some of the components earlier depicted and described as part of the computing devices 100, 400 and 800. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (which may correspond to the processor component 450) may include any of a wide variety of commercially available processors, employing any of a wide variety of technologies and implemented with one or more cores physically combined in any of a number of ways.

As previously discussed, the storage 960 (which may correspond to the storage 460) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (which may correspond to the interface(s) 490) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). More specifically, the interface controller 995b may incorporate one or more radio frequency (RF) transceivers and/or may be coupled to one or more antennae 991 (which may be incorporated into a portion of the interface 990) to exchange RF wireless signals with antenna(e) of one or more other devices as part of wireless communications on the depicted network 999. The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus includes a processor component, a network interface to couple the processor component to a network, a virtual switch and an interface control component. The virtual switch is to analyze contents of at least one packet of a set of packets to be received at the network interface and/or exchanged between endpoint devices through the network and the virtual switch, and to correlate the contents to a pathway to extend from the virtual switch through one or more virtual servers of multiple virtual servers and back to the virtual switch. The interface control component is to select at least one virtual network interface of at least one of the one or more virtual servers along the pathway to operate in a polling mode, and to select a virtual network interface of at least one virtual server of the multiple virtual servers not along the pathway to operate in a non-polling mode.

In Example 2, which includes the subject matter of Example 1, the apparatus may include a switch component to generate the virtual switch within a host session of a communications server.

In Example 3, which includes the subject matter of any of Examples 1-2, the processor component may include multiple processor cores, and the interface control component may dedicate each processor core of the multiple processor cores to each virtual network interface operated in the polling mode.

In Example 4, which includes the subject matter of any of Examples 1-3, the set of packets may be received from a first endpoint device coupled to the network at the network interface, and may be transmitted to a second endpoint device via the network after proceeding through the pathway.

In Example 5, which includes the subject matter of any of Examples 1-4, the contents may include at least one of a destination address of a header of the at least one packet, a type of data conveyed in a payload of the at least one packet or a size of a portion of data conveyed in the payload.

In Example 6, which includes the subject matter of any of Examples 1-5, the interface control component to respond to a determination by the virtual switch that contents of at least one packet of another set of packets cannot be correlated to any known pathway by operating the at least one virtual network interface of each virtual server of the multiple virtual servers in the polling mode while the other set of packets passes through at least one virtual server of the multiple virtual servers along another pathway, and the virtual switch may respond to the determination by monitoring which virtual servers of the multiple virtual servers the other set of packets passes through to correlate the other pathway to the other contents.

In Example 7, which includes the subject matter of any of Examples 1-6, the apparatus may include multiple application routines, each application routine of the multiple application routines may be executed within one of the virtual servers of the multiple virtual servers to perform a different type of processing on the set of packets, and the pathway may extend through the one or more virtual servers based at least on the type of processing performed by the application routine executed within each virtual server of the one or more virtual servers.

In Example 8, which includes the subject matter of any of Examples 1-7, the apparatus may include a virtual machine (VM) component to generate multiple VMs within a communications server, to configure each VM of the multiple VMs as a virtual server of the multiple virtual servers, to generate the at least one virtual network interface within each virtual server of the multiple virtual servers, and to cause execution of an application routine of multiple application routines within each virtual server of the multiple virtual servers.

In Example 9, which includes the subject matter of any of Examples 1-8, a virtual server of the one or more virtual servers along the pathway may include a first virtual network interface to receive the set of packets from the virtual switch, a second virtual network interface to transmit the set of packets to the virtual switch, a first packet buffer associated with the first virtual network interface to store packets of the set of packets received from the virtual switch prior to processing by an application routine executed within the virtual server, and a second packet buffer associated with the second virtual network interface to store packets of the set of packets processed by the application routine and prior to transmission to the virtual switch.

In Example 10, which includes the subject matter of any of Examples 1-9, the application routine may monitor a first level of fullness of the first packet buffer and a second level of fullness of the second packet buffer, may compare the first and second levels of fullness to at least a first threshold associated with buffer underflow and a second threshold associated with buffer overflow, may trigger execution of supplemental instructions unrelated to the processing of packets within the virtual server by a processor core that executes the application routine to reduce a rate of execution of instructions of the application routine associated with packet processing in response to either the first level falling below the first threshold or the second level rising above the second threshold, and may trigger cessation of the execution of the supplemental instructions in response to either the first level rising above the second threshold or the second level falling below the first threshold.

In Example 11, which includes the subject matter of any of Examples 1-10, the apparatus may include a process control component to monitor a first level of fullness of the first packet buffer and a second level of fullness of the second packet buffer, to compare the first and second levels of fullness to at least a first threshold associated with buffer underflow and a second threshold associated with buffer overflow, to reduce a processor frequency of a processor core that executes the application routine within the virtual server to reduce a rate of execution of instructions of the application routine associated with packet processing in response to either the first level falling below the first threshold or the second level rising above the second threshold, and to increase in the processor frequency in response to either the first level rising above the second threshold or the second level falling below the first threshold.

In Example 12, which includes the subject matter of any of Examples 1-11, the interface control component may refrain from operating a first virtual network interface of a first virtual server along the pathway and a second virtual network interface of a second virtual server along the pathway in the polling mode in response to a determination that the first virtual server is capable of directly providing the set of packets to the second virtual server in a manner that bypasses the virtual switch.

In Example 13, which includes the subject matter of any of Examples 1-12, the apparatus may include an interrupt controller, the non-polling may include an interrupt-driven mode, and the interrupt controller may receive an interrupt in response to a receipt of a packet by a virtual network interface operated in the interrupt-driven mode.

In Example 14, a computing-implemented method includes receiving from a network, at a virtual switch generated within a communications server, a set of packets to be exchanged between endpoint devices through the network; analyzing, at the virtual switch, contents of at least one packet of the set of packets; correlating the contents to a pathway extending from the virtual switch through one or more virtual servers of multiple virtual servers generated within the communications server, and back to the virtual switch; operating, within the communications server, at least one virtual network interface of at least one of the one or more virtual servers along the pathway in a polling mode; and operating, within the communications server, at least one virtual network interface of at least one virtual server not along the pathway in a non-polling mode.

In Example 15, which includes the subject matter of Example 14, the method may include generating, with at least one processor core of at least one processor component of the communications server, the virtual switch within a host session of the communications server.

In Example 16, which includes the subject matter of any of Examples 14-15, the communications server may include at least one processor component, the at least one processor component may include multiple processor cores, and the method may include dedicating each processor core of the multiple processor cores to each virtual network interface operated in the polling mode.

In Example 17, which includes the subject matter of any of Examples 14-16, the method may include receiving the set of packets from a first endpoint device coupled to the network and through a network interface of the communication server, and transmitting the set of packets to be transmitted to a second endpoint device via the network after the set of packets proceeds through the pathway.

In Example 18, which includes the subject matter of any of Examples 14-17, the contents may include at least one of a destination address of a header of the at least one packet, a type of data conveyed in a payload of the at least one packet or a size of a portion of data conveyed in the payload.

In Example 19, which includes the subject matter of any of Examples 14-18, the method may include analyzing contents of at least one packet of another set of packets; determining that the contents of the at least one packet of the other set of packets cannot be correlated to any known pathway; in response to the determination, operating the at least one virtual network interface of each virtual server of the multiple virtual servers in the polling mode while the other set of packets passes through at least one virtual server of the multiple virtual servers along another pathway; and in response to the determination, monitoring which virtual servers of the multiple virtual servers the other set of packets passes through to correlate the other pathway to the other contents.

In Example 20, which includes the subject matter of any of Examples 14-19, the method may include executing each application routine of multiple application routines within one of the virtual servers of the multiple virtual servers to perform a different type of processing on the set of packets, and the pathway may extend through the one or more virtual servers based at least on the type of processing performed by the application routine executed within each virtual server of the one or more virtual servers.

In Example 21, which includes the subject matter of any of Examples 14-20, the method may include generating multiple virtual machines (VMs) within the communications server, configuring each VM of the multiple VMs as a virtual server of the multiple virtual servers, generating the at least one virtual network interface within each virtual server of the multiple virtual servers, and executing an application routine of multiple application routines within each virtual server of the multiple virtual servers.

In Example 22, which includes the subject matter of any of Examples 14-21, the method may include generating, within a virtual server of the one or more virtual servers along the pathway, a first virtual network interface to receive the set of packets from the virtual switch, a second virtual network interface to transmit the set of packets to the virtual switch, a first packet buffer associated with the first virtual network interface to store packets of the set of packets received from the virtual switch prior to processing by an application routine executed within the virtual server, and a second packet buffer associated with the second virtual network interface to store packets of the set of packets processed by the application routine and prior to transmission to the virtual switch.

In Example 23, which includes the subject matter of any of Examples 14-22, the method may include monitoring a first level of fullness of the first packet buffer and a second level of fullness of the second packet buffer; comparing the first and second levels of fullness to at least a first threshold associated with buffer underflow and a second threshold associated with buffer overflow; executing supplemental instructions unrelated to the processing of packets within the virtual server by a processor core that executes the application routine to reduce a rate of execution of instructions of the application routine associated with packet processing in response to either the first level falling below the first threshold or the second level rising above the second threshold; and ceasing execution of the supplemental instructions in response to either the first level rising above the second threshold or the second level falling below the first threshold.

In Example 24, which includes the subject matter of any of Examples 14-23, the method may include monitoring a first level of fullness of the first packet buffer and a second level of fullness of the second packet buffer; comparing the first and second levels of fullness to at least a first threshold associated with buffer underflow and a second threshold associated with buffer overflow; reducing a processor frequency of a processor core that executes the application routine within the virtual server to reduce a rate of execution of instructions of the application routine associated with packet processing in response to either the first level falling below the first threshold or the second level rising above the second threshold; and increasing the processor frequency in response to either the first level rising above the second threshold or the second level falling below the first threshold.

In Example 25, which includes the subject matter of any of Examples 14-24, the method may include determining that a first virtual server along the pathway is capable of directly providing the set of packets to a second virtual server along the pathway in a manner that bypasses the virtual switch; and refraining from operating a first virtual network interface of the first virtual server and a second virtual network interface of the second virtual server in response to the determination.

In Example 26, at least one tangible machine-readable storage medium includes instructions that when executed by a processor component, may cause the processor component to analyze, at a virtual switch generated within a communications server, contents of at least one packet of a set of packets to be exchanged between endpoint devices through the network; correlate the contents to a pathway extending from the virtual switch through one or more virtual servers of multiple virtual servers generated within the communications server, and back to the virtual switch; operate, within the communications server, at least one virtual network interface of at least one of the one or more virtual servers along the pathway in a polling mode; and operate, within the communications server, at least one virtual network interface of at least one virtual server not along the pathway in a non-polling mode.

In Example 27, which includes the subject matter of Example 26, the processor component may be caused to generate, with at least one processor core, the virtual switch within a host session of the communications server.

In Example 28, which includes the subject matter of any of Examples 26-27, the communications server may include the processor component, the processor component may include multiple processor cores, and the processor component may be caused to dedicate each processor core of the multiple processor cores to each virtual network interface operated in the polling mode.

In Example 29, which includes the subject matter of any of Examples 26-28, the processor component may be caused to receive the set of packets from a first endpoint device coupled to the network and through a network interface of the communication server, and transmit the set of packets to be transmitted to a second endpoint device via the network after the set of packets proceeds through the pathway.

In Example 30, which includes the subject matter of any of Examples 26-29, the contents may include at least one of a destination address of a header of the at least one packet, a type of data conveyed in a payload of the at least one packet or a size of a portion of data conveyed in the payload.

In Example 31, which includes the subject matter of any of Examples 26-30, the processor component may be caused to analyze contents of at least one packet of another set of packets; determine that the contents of the at least one packet of the other set of packets cannot be correlated to any known pathway; in response to the determination, operate the at least one virtual network interface of each virtual server of the multiple virtual servers in the polling mode while the other set of packets passes through at least one virtual server of the multiple virtual servers along another pathway; and in response to the determination, monitor which virtual servers of the multiple virtual servers the other set of packets passes through to correlate the other pathway to the other contents.

In Example 32, which includes the subject matter of any of Examples 26-31, the processor component may be caused to execute each application routine of multiple application routines within one of the virtual servers of the multiple virtual servers to perform a different type of processing on the set of packets, and the pathway may extend through the one or more virtual servers based at least on the type of processing performed by the application routine executed within each virtual server of the one or more virtual servers.

In Example 33, which includes the subject matter of any of Examples 26-32, the processor component may be caused to generate multiple virtual machines (VMs) within the communications server; configure each VM of the multiple VMs as a virtual server of the multiple virtual servers; generate the at least one virtual network interface within each virtual server of the multiple virtual servers; and execute an application routine of multiple application routines within each virtual server of the multiple virtual servers.

In Example 34, which includes the subject matter of any of Examples 26-33, the processor component may be caused to generate, within a virtual server of the one or more virtual servers along the pathway, a first virtual network interface to receive the set of packets from the virtual switch, a second virtual network interface to transmit the set of packets to the virtual switch, a first packet buffer associated with the first virtual network interface to store packets of the set of packets received from the virtual switch prior to processing by an application routine executed within the virtual server, and a second packet buffer associated with the second virtual network interface to store packets of the set of packets processed by the application routine and prior to transmission to the virtual switch.

In Example 35, which includes the subject matter of any of Examples 26-34, the processor component may be caused to monitor a first level of fullness of the first packet buffer and a second level of fullness of the second packet buffer; compare the first and second levels of fullness to at least a first threshold associated with buffer underflow and a second threshold associated with buffer overflow; execute supplemental instructions unrelated to the processing of packets within the virtual server by a processor core that executes the application routine to reduce a rate of execution of instructions of the application routine associated with packet processing in response to either the first level falling below the first threshold or the second level rising above the second threshold; and cease execution of the supplemental instructions in response to either the first level rising above the second threshold or the second level falling below the first threshold.

In Example 36, which includes the subject matter of any of Examples 26-35, the processor component may be caused to monitor a first level of fullness of the first packet buffer and a second level of fullness of the second packet buffer; compare the first and second levels of fullness to at least a first threshold associated with buffer underflow and a second threshold associated with buffer overflow; reduce a processor frequency of a processor core that executes the application routine within the virtual server to reduce a rate of execution of instructions of the application routine associated with packet processing in response to either the first level falling below the first threshold or the second level rising above the second threshold; and increase the processor frequency in response to either the first level rising above the second threshold or the second level falling below the first threshold.

In Example 37, which includes the subject matter of any of Examples 26-36, the processor component may be caused to determine that a first virtual server along the pathway is capable of directly providing the set of packets to a second virtual server along the pathway in a manner that bypasses the virtual switch, and refrain from operating a first virtual network interface of the first virtual server and a second virtual network interface of the second virtual server in response to the determination.

In Example 38, an apparatus includes a processor component, a network interface to couple the processor component to a network, an interface control component, and a virtual switch. The interface control component is to operate at least one virtual network interface of each virtual server of multiple virtual servers in a polling mode during a learning mode, and to operate the at least one virtual network interface of each virtual server of the multiple virtual servers in a non-polling mode in response to a determination that a criterion to cease the learning mode has been met. The virtual switch is to monitor a pathway taken by a set of packets from the virtual switch, through the at least one virtual interface of one or more virtual servers of the multiple virtual servers and back to the virtual switch during the learning mode, to correlate the pathway to contents of at least one packet of the set of packets during the learning mode, and to determine whether the criterion to cease the learning mode has been met.

In Example 39, which includes the subject matter of Example 38, the apparatus may include a switch component to generate the virtual switch within a host session of a communications server.

In Example 40, which includes the subject matter of any of Examples 38-39, the processor component may include multiple processor cores, and the interface control component may dedicate each processor core of the multiple processor cores to each virtual network interface operated in the polling mode.

In Example 41, which includes the subject matter of any of Examples 38-40, the set of packets may be received from a first endpoint device coupled to the network at the network interface, and the set of packets may be transmitted to a second endpoint device via the network after proceeding through the pathway.

In Example 42, which includes the subject matter of any of Examples 38-41, the contents may include at least one of a destination address of a header of the at least one packet, a type of data conveyed in a payload of the at least one packet or a size of a portion of data conveyed in the payload.

In Example 43, which includes the subject matter of any of Examples 38-42, the apparatus may include multiple application routines, each application routine of the multiple application routines may be executed within one of the virtual servers of the multiple virtual servers to perform a different type of processing on the set of packets, and the pathway may extend through the one or more virtual servers based at least on the type of processing performed by the application routine executed within each virtual server of the one or more virtual servers.

In Example 44, which includes the subject matter of any of Examples 38-43, the apparatus may include a virtual machine (VM) component to generate multiple VMs within a communications server, to configure each VM of the multiple VMs as a virtual server of the multiple virtual servers, to generate the at least one virtual network interface within each virtual server of the multiple virtual servers, and to cause execution of an application routine of multiple application routines within each virtual server of the multiple virtual servers.

In Example 45, which includes the subject matter of any of Examples 38-44, the criterion may include a predetermined quantity of sets of packets proceeding through one or more of the virtual servers with none of the predetermined quantity of sets of packets taking a pathway not already monitored by virtual switch.

In Example 46, at least one tangible machine-readable storage medium may include instructions that when executed by a processor component, cause the processor component to perform any of the above.

In Example 47, an apparatus may include means for performing any of the above.

The invention claimed is:

1. An apparatus to control communications comprising:
   a processor component;
   a network interface to couple the processor component to a network;
   a virtual switch to analyze contents of at least one packet of a set of packets to be received at the network interface, and to determine a pathway for the at least one packet to proceed based on the contents, the pathway for the at least one packet to proceed comprising a path from the virtual switch through one or more virtual servers of multiple virtual servers and back to the virtual switch; and
   an interface control component to instruct at least one virtual network interface of at least one of the one or more virtual servers along the pathway to operate in a polling mode, and to instruct a virtual network interface of at least one virtual server of the multiple virtual servers not along the pathway to operate in a non-polling mode.

2. The apparatus of claim 1, the interface control component to respond to a determination by the virtual switch that contents of at least one packet of another set of packets cannot be correlated to any known pathway by operating the at least one virtual network interface of each virtual server of the multiple virtual servers in the polling mode while the other set of packets passes through at least one virtual server of the multiple virtual servers along another pathway, and the virtual switch to respond to the determination by monitoring which virtual servers of the multiple virtual servers the other set of packets passes through to correlate the other pathway to the other contents.

3. The apparatus of claim 1, comprising multiple application routines, each one of the virtual servers of the multiple virtual servers to execute at least one of the multiple application routines, and the pathway to extend through the one or more virtual servers based at least on the type of processing performed by the application routine executed within each virtual server of the one or more virtual servers.

4. The apparatus of claim 1, comprising a virtual machine (VM) component to generate multiple VMs within a communications server, to configure each VM of the multiple VMs as a virtual server of the multiple virtual servers, to generate the at least one virtual network interface within each virtual server of the multiple virtual servers, and to cause execution of an application routine of multiple application routines within each virtual server of the multiple virtual servers.

5. The apparatus of claim 4, a virtual server of the one or more virtual servers along the pathway comprising:
   a first virtual network interface to receive the set of packets from the virtual switch;
   a second virtual network interface to transmit the set of packets to the virtual switch;
   a first packet buffer associated with the first virtual network interface to store packets of the set of packets received from the virtual switch prior to processing by an application routine executed within the virtual server; and
   a second packet buffer associated with the second virtual network interface to store packets of the set of packets processed by the application routine and prior to transmission to the virtual switch.

6. The apparatus of claim 5, comprising a process control component to monitor a first level of fullness of the first packet buffer and a second level of fullness of the second packet buffer, to compare the first and second levels of fullness to at least a first threshold associated with buffer underflow and a second threshold associated with buffer overflow, to reduce a processor frequency of a processor core that executes the application routine within the virtual server to reduce a rate of execution of instructions of the application routine associated with packet processing in response to either the first level falling below the first threshold or the second level rising above the second threshold, and to increase in the processor frequency in response to either the first level rising above the second threshold or the second level falling below the first threshold.

7. A computer-implemented method for controlling wireless communications comprising:
   receiving from a network, at a virtual switch generated within a communications server, a set of packets to be exchanged between endpoint devices through the network;
   analyzing, at the virtual switch, contents of at least one packet of the set of packets;
   determining a pathway for the at least one packet to proceed based on the contents, the pathway for the at least one packet to proceed comprising a path from the virtual switch through one or more virtual servers of multiple virtual servers and back to the virtual switch;
   causing at least one virtual network interface of at least one of the one or more virtual servers along the pathway to operate, within the communications server, in a polling mode; and
   causing at least one virtual network interface of at least one of the one or more virtual servers along the pathway to operate, within the communications server, in a non-polling mode.

8. The computer-implemented method of claim 7, the communications server comprising at least one processor component, the at least one processor component comprising multiple processor cores, and the method comprising dedicating each processor core of the multiple processor cores to each virtual network interface operated in the polling mode.

9. The computer-implemented method of claim 7, the method comprising:
   analyzing contents of at least one packet of another set of packets;
   determining that the contents of the at least one packet of the other set of packets cannot be correlated to any known pathway;
   in response to the determination, operating the at least one virtual network interface of each virtual server of the multiple virtual servers in the polling mode while the other set of packets passes through at least one virtual server of the multiple virtual servers along another pathway; and
   in response to the determination, monitoring which virtual servers of the multiple virtual servers the other set of packets passes through to correlate the other pathway to the other contents.

10. The computer-implemented method of claim 7, the method comprising executing at least one application routine of multiple application routines within each one of the virtual servers of the multiple virtual servers to perform a different type of processing on the set of packets, the pathway to extend through the one or more virtual servers based at least on the type of processing performed by the application routine executed within each virtual server of the one or more virtual servers.

11. The computer-implemented method of claim 7, the method comprising:
generating multiple virtual machines (VMs) within the communications server;
configuring each VM of the multiple VMs as a virtual server of the multiple virtual servers;
generating the at least one virtual network interface within each virtual server of the multiple virtual servers; and
executing an application routine of multiple application routines within each virtual server of the multiple virtual servers.

12. The computer-implemented method of claim 11, the method comprising generating, within a virtual server of the one or more virtual servers along the pathway, a first virtual network interface to receive the set of packets from the virtual switch, a second virtual network interface to transmit the set of packets to the virtual switch, a first packet buffer associated with the first virtual network interface to store packets of the set of packets received from the virtual switch prior to processing by an application routine executed within the virtual server, and a second packet buffer associated with the second virtual network interface to store packets of the set of packets processed by the application routine and prior to transmission to the virtual switch.

13. At least one non-transitory machine-readable storage medium comprising instructions that when executed by a processor component, cause the processor component to:
analyze, at a virtual switch generated within a communications server, contents of at least one packet of a set of packets to be exchanged between endpoint devices through a network;
determine a pathway for the at least one packet to proceed based on the contents, the pathway for the at least one packet to proceed comprising a path from the virtual switch through one or more virtual servers of multiple virtual servers and back to the virtual switch;
cause at least one virtual network interface of at least one of the one or more virtual servers along the pathway to operate, within the communications server, in a polling mode;
cause at least one virtual network interface of at least one of the one or more virtual servers along the pathway to operate, within the communications server, in a non-polling mode;
analyze contents of at least one packet of another set of packets;
determine that the contents of the at least one packet of the other set of packets cannot be correlated to any known pathway;
in response to the determination, operate the at least one virtual network interface of each virtual server of the multiple virtual servers in the polling mode while the other set of packets passes through at least one virtual server of the multiple virtual servers along another pathway; and
in response to the determination, monitor which virtual servers of the multiple virtual servers the other set of packets passes through to correlate the other pathway to the other contents.

14. The at least one non-transitory machine-readable storage medium of claim 13, the processor component caused to execute at least one application routine of multiple application routines within each one of the virtual servers of the multiple virtual servers to perform a different type of processing on the set of packets, the pathway to extend through the one or more virtual servers based at least on the type of processing performed by the application routine executed within each virtual server of the one or more virtual servers.

15. The at least one non-transitory machine-readable storage medium of claim 13, the processor component caused to:
generate multiple virtual machines (VMs) within the communications server;
configure each VM of the multiple VMs as a virtual server of the multiple virtual servers;
generate the at least one virtual network interface within each virtual server of the multiple virtual servers; and
execute an application routine of multiple application routines within each virtual server of the multiple virtual servers.

16. The at least one non-transitory machine-readable storage medium of claim 15, the processor component caused to generate, within a virtual server of the one or more virtual servers along the pathway, a first virtual network interface to receive the set of packets from the virtual switch, a second virtual network interface to transmit the set of packets to the virtual switch, a first packet buffer associated with the first virtual network interface to store packets of the set of packets received from the virtual switch prior to processing by an application routine executed within the virtual server, and a second packet buffer associated with the second virtual network interface to store packets of the set of packets processed by the application routine and prior to transmission to the virtual switch.

17. The at least one non-transitory machine-readable storage medium of claim 16, the processor component caused to:
monitor a first level of fullness of the first packet buffer and a second level of fullness of the second packet buffer;
compare the first and second levels of fullness to at least a first threshold associated with buffer underflow and a second threshold associated with buffer overflow;
execute supplemental instructions unrelated to the processing of packets within the virtual server by a processor core that executes the application routine to reduce a rate of execution of instructions of the application routine associated with packet processing in response to either the first level falling below the first threshold or the second level rising above the second threshold; and
cease execution of the supplemental instructions in response to either the first level rising above the second threshold or the second level falling below the first threshold.

18. The at least one non-transitory machine-readable storage medium of claim 13, the processor component caused to:
determine that a first virtual server along the pathway is capable of directly providing the set of packets to a second virtual server along the pathway in a manner that bypasses the virtual switch; and
refrain from operating a first virtual network interface of the first virtual server and a second virtual network interface of the second virtual server in response to the determination.

19. An apparatus to control communications comprising:
a processor component;
a network interface to couple the processor component to a network;

an interface control component to cause at least one virtual network interface of each virtual server of multiple virtual servers to operate in a polling mode during a learning mode, and to cause the at least one virtual network interface of each virtual server of the multiple virtual servers to operate in a non-polling mode in response to a determination that a criterion to cease the learning mode has been met; and a virtual switch to monitor a pathway taken by a set of packets from the virtual switch, through the at least one virtual interface of one or more virtual servers of the multiple virtual servers and back to the virtual switch during the learning mode, to correlate the pathway to contents of at least one packet of the set of packets during the learning mode, and to determine whether the criterion to cease the learning mode has been met.

20. The apparatus of claim 19, the processor component comprising multiple processor cores, the interface control component to dedicate each processor core of the multiple processor cores to each virtual network interface operated in the polling mode.

21. The apparatus of claim 19, the contents comprising at least one of a destination address of a header of the at least one packet, a type of data conveyed in a payload of the at least one packet or a size of a portion of data conveyed in the payload.

22. The apparatus of claim 19, comprising multiple application routines, each application routine of the multiple application routines to be executed within one of the virtual servers of the multiple virtual servers to perform a different type of processing on the set of packets, and the pathway to extend through the one or more virtual servers based at least on the type of processing performed by the application routine executed within each virtual server of the one or more virtual servers.

23. The apparatus of claim 19, comprising a virtual machine (VM) component to generate multiple VMs within a communications server, to configure each VM of the multiple VMs as a virtual server of the multiple virtual servers, to generate the at least one virtual network interface within each virtual server of the multiple virtual servers, and to cause execution of an application routine of multiple application routines within each virtual server of the multiple virtual servers.

24. The apparatus of claim 19, the criterion comprising a predetermined quantity of sets of packets proceeding through one or more of the virtual servers with none of the predetermined quantity of sets of packets taking a pathway not already monitored by the virtual switch.

* * * * *